United States Patent
Onuma et al.

(10) Patent No.: US 11,402,261 B2
(45) Date of Patent: Aug. 2, 2022

(54) LIGHT DETECTION SYSTEM, DISCHARGE PROBABILITY CALCULATING METHOD, AND RECEIVED LIGHT QUANTITY MEASURING METHOD

(71) Applicant: Azbil Corporation, Tokyo (JP)

(72) Inventors: Shun Onuma, Tokyo (JP); Raita Mori, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 49 days.

(21) Appl. No.: 17/169,752

(22) Filed: Feb. 8, 2021

(65) Prior Publication Data
US 2021/0255035 A1 Aug. 19, 2021

(30) Foreign Application Priority Data
Feb. 18, 2020 (JP) .............................. JP2020-025481

(51) Int. Cl.
*G01J 1/42* (2006.01)
*G01J 1/02* (2006.01)
*G01J 1/44* (2006.01)

(52) U.S. Cl.
CPC ............ *G01J 1/4209* (2013.01); *G01J 1/0228* (2013.01); *G01J 1/0266* (2013.01); *G01J 2001/444* (2013.01)

(58) Field of Classification Search
CPC ...... G01J 1/4209; G01J 1/0228; G01J 1/0266; G01J 2001/444; G01J 1/044; G01J 1/10; G01J 1/429; G01J 5/30; G01J 5/0018; G01J 1/44; G01J 2001/4446; G06F 17/18; H01J 40/14

See application file for complete search history.

(56) References Cited

U.S. PATENT DOCUMENTS

| 9,417,124 B1* | 8/2016 | Zabel ...................... F23N 5/082 |
| 9,939,317 B1 | 4/2018 | Mori | |
| 2009/0072737 A1* | 3/2009 | Cole ....................... F23N 5/082 |
| | | | 313/539 |
| 2018/0142890 A1 | 5/2018 | Mori | |

FOREIGN PATENT DOCUMENTS

| JP | H05-012581 A | 1/1993 |
| JP | 2018-084422 A | 5/2018 |
| JP | 2018-084423 A | 5/2018 |

* cited by examiner

*Primary Examiner* — Seung C Sohn

(57) ABSTRACT

To calculate a probability of an optical sensor's irregular discharge, a light detection system includes an optical sensor, an application voltage generating circuit that applies a drive pulse voltage to the optical sensor, a discharge determining portion that detects the optical sensor's discharge, a discharge probability calculating portion that calculates a discharge probability for each of first and second states in which the optical sensor is shielded from light and the drive pulse voltage's width in the second state is different from the first state, a sensitivity parameter storing portion storing the drive pulse voltage's reference pulse width as the optical sensor's sensitivity parameter, and another discharge probability calculating portion that calculates an irregular discharge's probability that occurs without depending on the optical sensor's received light quantity, based on the sensitivity parameter, and the discharge probabilities calculated and the drive pulse voltage's widths in the first and second states.

18 Claims, 8 Drawing Sheets

LIGHT DETECTION SYSTEM, DISCHARGE PROBABILITY CALCULATING METHOD, AND RECEIVED LIGHT QUANTITY MEASURING METHOD

CROSS REFERENCE TO RELATED APPLICATIONS

This patent application claims the benefit of foreign priority to Japanese Patent Application No. JP 2020-025481 filed on Feb. 18, 2020, the disclosure of which is hereby incorporated by reference in its entirety.

BACKGROUND OF THE INVENTION

The present disclosure relates to a light detection system configured to detect light such as a flame.

As an optical sensor configured to detect the presence or absence of a flame based on ultraviolet rays emitted from light of the flame in a combustion furnace or the like, a photoelectric tube type ultraviolet sensor may be used. It has been observed that an irregular discharge phenomenon (pseudo discharge) caused by a noise component other than a discharge occurring due to a photoelectric effect occurs in discharge of the photoelectric tube type ultraviolet sensor.

PTL 1 proposes a flame detection system in which a pulse width of a drive pulse to be applied to an optical sensor is controlled to obtain a received light quantity of the discharge from a calculation so that a life of a flame sensor can be determined based on a light quantity. However, the discharge of the actual optical sensor includes an irregular discharge caused by a noise, which is generally referred to as a failure, and thus there is a case where the discharge occurs even when light generated by the flame does not exist and causes erroneous detection. In order to eliminate such an erroneous detection of a discharge, it is necessary to consider a method of measuring a discharge probability in consideration of a noise component.

Further, in a flame detection system disclosed in PTL 2, a method of obtaining the received light quantity in consideration of a discharge probability of a noise component other than a regular discharge is proposed, which enables accurate detection of the presence or absence of a flame. However, in the flame detection system disclosed in PTL 2, the discharge probability of the noise component needs to be known.

Further, in a failure detecting device disclosed in PTL 3, it has been proposed to provide a shutter mechanism configured to block an electromagnetic wave incident on an optical sensor to detect a failure due to a self discharge of the optical sensor. However, in the failure detecting device disclosed in PTL 3, there is no discriminating method for distinguishing between the regular discharge and the irregular discharge with the change in measurement sensitivity due to the life of the optical sensor, and thus there is a possibility of erroneous detection of the failure.

It should be noted that the above problems occur not only in the flame detection system but also in the light detection system using the optical sensor.

CITATION LIST

Patent Literature

[PTL 1] JP-A-2018-84422
[PTL 2] JP-A-2018-84423
[PTL 3] JP-A-05-012581

BRIEF SUMMARY OF THE INVENTION

The present disclosure has been made to solve the above-mentioned problems, and an object of the present disclosure is to provide a light detection system and a discharge probability calculating method capable of calculating a discharge probability of an irregular discharge caused by a noise component other than a discharge occurring due to a photoelectric effect of an optical sensor, which occurs without depending on a received light quantity received by the optical sensor.

Another object of the present disclosure is to provide a light detection system and a received light quantity measuring method capable of calculating a received light quantity even when a part of a discharge probability of a noise component is an unknown number.

A light detection system of the present disclosure includes: an optical sensor configured to detect light emitted from a first light source; an application voltage generating portion configured to periodically apply a drive pulse voltage to an electrode of the optical sensor; a current detecting portion configured to detect a discharge current of the optical sensor; a discharge determining portion configured to detect a discharge of the optical sensor based on the discharge current detected by the current detecting portion; a first discharge probability calculating portion configured to calculate a discharge probability based on the number of times of application of the drive pulse voltage applied by the application voltage generating portion and the number of times of discharge detected by the discharge determining portion during the application of the drive pulse voltage for each of a first state in which the optical sensor is shielded from the light, and a second state in which the optical sensor is shielded from the light and a pulse width of the drive pulse voltage is different from that of the first state; a storing portion configured to store, in advance as a known sensitivity parameter of the optical sensor, a reference pulse width of the drive pulse voltage; and a second discharge probability calculating portion configured to calculate a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated by the first discharge probability calculating portion in the first and second states, and the pulse widths of the drive pulse voltage in the first and second states.

Further, a light detection system of the present disclosure includes: an optical sensor configured to detect light emitted from a first light source; an application voltage generating portion configured to periodically apply a drive pulse voltage to an electrode of the optical sensor; a current detecting portion configured to detect a discharge current of the optical sensor; a discharge determining portion configured to detect a discharge of the optical sensor based on the discharge current detected by the current detecting portion; a first discharge probability calculating portion configured to calculate a discharge probability based on the number of times of application of the drive pulse voltage applied by the application voltage generating portion and the number of times of discharge detected by the discharge determining portion during the application of the drive pulse voltage for each of a first state in which the optical sensor is shielded from the light, a second state in which the optical sensor is shielded from the light and a pulse width of the drive pulse voltage is different from that of the first state, and a third state in which the optical sensor is shielded from the light and a pulse width of the drive pulse voltage is the same as that of either the first or second state or different from those of the first and second states; a storing portion configured to store, in advance as a known sensitivity parameter of the optical sensor, a reference pulse width of the drive pulse voltage; and a second discharge probability calculating portion configured to calculate a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated by the first discharge probability calculating portion in the first, second, and third states, and the pulse widths of the drive pulse voltage in the first, second, and third states.

Further, one configuration example of the light detection system of the present disclosure further includes: a second light source having a known light quantity, which is installed such that generated light is incident on the optical sensor together with the light from the first light source; a light source control portion configured to control turning-on/turning-off of the second light source; and a received light quantity calculating portion configured to calculate the received light quantity of the optical sensor, in which the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, a third state in which the second light source is turned on or turned off, and a fourth state in which a turning-on/turning-off state of the second light source is different from that of the third state and a pulse width of the drive pulse voltage is the same as that of the third state, the storing portion is configured to store, in advance as known sensitivity parameters of the optical sensor, a difference in received light quantity received by the optical sensor between the third state and the fourth state in addition to the reference pulse width of the drive pulse voltage, and the received light quantity calculating portion is configured to calculate the received light quantities received by the optical sensor in the third and fourth states based on the sensitivity parameters stored in the storing portion, the discharge probabilities calculated by the first discharge probability calculating portion in the third and fourth states, the pulse widths of the drive pulse voltage in the third and fourth states, and the discharge probabilities calculated by the second discharge probability calculating portion.

Further, one configuration example of the light detection system of the present disclosure further includes: a second light source having a known light quantity, which is installed such that generated light is incident on the optical sensor together with the light from the first light source; a light source control portion configured to control turning-on/turning-off of the second light source; and a received light quantity calculating portion configured to calculate the received light quantity of the optical sensor, in which the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, a third state in which the second light source is turned on or turned off, a fourth state in which a turning-on/turning-off state of the second light source is different from that of the third state and a pulse width of the drive pulse voltage is the same as that of the third state, and a fifth state in which the second light source is turned off and a pulse width of the drive pulse voltage is the same as that of the third and fourth states, the storing portion is configured to store, in advance as known sensitivity parameters of the optical sensor, a difference in received light quantity received by the optical sensor between the third state and the fourth state in addition to the reference pulse width of the drive pulse voltage, and the received light quantity calculating portion is configured to calculate received light quantities received by the optical sensor in the third, fourth, and fifth states based on the sensitivity parameters stored in the storing portion, the discharge probabilities calculated by the first discharge probability calculating portion in the third, fourth, and fifth states, the pulse widths of the drive pulse voltage in the third, fourth, and fifth states, and the discharge probabilities calculated by the second discharge probability calculating portion.

Further, one configuration example of the light detection system of the present disclosure further includes: a second light source having a known light quantity, which is installed such that generated light is incident on the optical sensor together with the light from the first light source; a light source control portion configured to control turning-on/turning-off of the second light source; and a received light quantity calculating portion configured to calculate the received light quantity of the optical sensor, in which the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, the third state, a fourth state in which the second light source is turned on or turned off, and a fifth state in which a turning-on/turning-off state of the second light source is different from that of the fourth state and a pulse width of the drive pulse voltage is the same as that of the fourth state, the storing portion is configured to store, in advance as known sensitivity parameters of the optical sensor, a difference in received light quantity received by the optical sensor between the fourth state and the fifth state in addition to the reference pulse width of the drive pulse voltage, and the received light quantity calculating portion is configured to calculate the received light quantities received by the optical sensor in the fourth and fifth states based on the sensitivity parameters stored in the storing portion, the discharge probabilities calculated by the first discharge probability calculating portion in the fourth and fifth states, the pulse widths of the drive pulse voltage in the fourth and fifth states, and the discharge probabilities calculated by the second discharge probability calculating portion.

Further, one configuration example of the light detection system of the present disclosure further includes: a second light source having a known light quantity, which is installed such that generated light is incident on the optical sensor together with the light from the first light source; a light source control portion configured to control turning-on/turning-off of the second light source; and a received light quantity calculating portion configured to calculate the received light quantity of the optical sensor, in which the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, the third state, a fourth state in which the second light source is turned on or turned off, a fifth state in which a turning-on/turning-off state of the second light source is different from that of the fourth state and a pulse width of the drive pulse voltage is the same as that of the fourth state, and a sixth state in which the second light source is turned off and a pulse width of the drive pulse voltage is the same as that of the fourth and fifth states, the storing portion is configured to store, in advance as known sensitivity parameters of the optical sensor, a difference in received light quantity received by the optical sensor between the fourth state and the fifth state in addition to the reference pulse width of the drive pulse voltage, and the received light quantity calculating portion is configured to calculate received light quantities received by the optical sensor in the fourth, fifth, and sixth states based on the sensitivity parameters stored in the storing portion, the discharge probabilities calculated by the first discharge probability calculating portion in the fourth, fifth, and sixth states, the pulse widths of the drive pulse voltage in the fourth, fifth, and sixth states, and the discharge probabilities calculated by the second discharge probability calculating portion.

Further, a discharge probability calculating method of a light detection system of the present disclosure includes: a first step of periodically applying a drive pulse voltage to an electrode of an optical sensor that detects light emitted from a light source in a first state in which the optical sensor is shielded from the light; a second step of detecting a discharge current of the optical sensor in the first state; a third step of detecting a discharge of the optical sensor based on the discharge current in the first state; a fourth step of calculating a discharge probability in the first state based on the number of times of application of the drive pulse voltage applied in the first step and the number of times of discharge detected in the third step during the application of the drive pulse voltage; a fifth step of periodically applying the drive pulse voltage to the electrode of the optical sensor in a second state in which the optical sensor is shielded from the light and a pulse width of the drive pulse voltage is different from that of the first state; a sixth step of detecting a discharge current of the optical sensor in the second state; a seventh step of detecting a discharge of the optical sensor based on the discharge current in the second state; an eighth step of calculating a discharge probability in the second state based on the number of times of application of the drive pulse voltage applied in the fifth step and the number of times of discharge detected in the seventh step during the application of the drive pulse voltage; and a ninth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth and eighth steps, and the pulse widths of the drive pulse voltage in the first and second states.

Further, a discharge probability calculating method of a light detection system of the present disclosure includes: a first step of periodically applying a drive pulse voltage to an electrode of an optical sensor that detects light emitted from a light source in a first state in which the optical sensor is shielded from the light; a second step of detecting a discharge current of the optical sensor in the first state; a third step of detecting a discharge of the optical sensor based on the discharge current in the first state; a fourth step of calculating a discharge probability in the first state based on the number of times of application of the drive pulse voltage applied in the first step and the number of times of discharge detected in the third step during the application of the drive pulse voltage; a fifth step of periodically applying the drive pulse voltage to the electrode of the optical sensor in a second state in which the optical sensor is shielded from the light and a pulse width of the drive pulse voltage is different from that of the first state; a sixth step of detecting a discharge current of the optical sensor in the second state; a seventh step of detecting a discharge of the optical sensor based on the discharge current in the second state; an eighth step of calculating a discharge probability in the second state based on the number of times of application of the drive pulse voltage applied in the fifth step and the number of times of discharge detected in the seventh step during the application of the drive pulse voltage; a ninth step of periodically applying the drive pulse voltage to the electrode of the optical sensor in a third state in which the optical sensor is shielded from the light and a pulse width of the drive pulse voltage is the same as that of either the first or second state or different from those of the first and second states; a tenth step of detecting a discharge current of the optical sensor in the third state; an eleventh step of detecting a discharge of the optical sensor based on the discharge current in the third state; a twelfth step of calculating a discharge probability in the third state based on the number of times of application of the drive pulse voltage applied in the ninth step and the number of times of discharge detected in the eleventh step during the application of the drive pulse voltage; and a thirteenth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth, eighth, and twelfth steps, and the pulse widths of the drive pulse voltage in the first, second, and third states.

Further, a received light quantity measuring method of a light detection system of the present disclosure includes: a first step of periodically applying a drive pulse voltage to an electrode of an optical sensor that detects light emitted from a first light source in a first state in which the optical sensor is shielded from the light; a second step of detecting a discharge current of the optical sensor in the first state; a third step of detecting a discharge of the optical sensor based on the discharge current in the first state; a fourth step of calculating a discharge probability in the first state based on the number of times of application of the drive pulse voltage applied in the first step and the number of times of discharge detected in the third step during the application of the drive pulse voltage; a fifth step of periodically applying the drive pulse voltage to the electrode of the optical sensor in a second state in which the optical sensor is shielded from the light and a pulse width of the drive pulse voltage is different from that of the first state; a sixth step of detecting a discharge current of the optical sensor in the second state; a seventh step of detecting a discharge of the optical sensor based on the discharge current in the second state; an eighth step of calculating a discharge probability in the second state based on the number of times of application of the drive pulse voltage applied in the fifth step and the number of times of discharge detected in the seventh step during the application of the drive pulse voltage; a ninth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth and eighth steps, and the pulse widths of the drive pulse voltage in the first and second states; a tenth step of periodically applying the drive pulse voltage to the electrode of the optical sensor in a third state in which light from a second light source having a known light quantity is incident on the optical sensor or the second light source is turned off; an eleventh step of detecting a discharge current of the optical sensor in the third state; a twelfth step of detecting a discharge of the optical sensor based on the discharge current in the third state; a thirteenth step of calculating a discharge probability in the third state based on the number of times of application of the drive pulse voltage applied in the tenth step and the number of times of discharge detected in the twelfth step during the application of the drive pulse voltage; a fourteenth step of periodically applying the drive pulse voltage to the electrode of the optical sensor in a fourth state in which a turning-on/turning-off state of the second light source is different from that of the third state and a pulse width of the drive pulse voltage is the same as that of the third state; a fifteenth step of detecting a discharge current of the optical sensor in the fourth state; a sixteenth step of detecting a discharge of the optical sensor based on the discharge current in the fourth state; a seventeenth step of calculating a discharge probability in the fourth state based on the number of times of application of the drive pulse voltage applied in the fourteenth step and the number of times of discharge detected in the sixteenth step during the application of the drive pulse voltage; and an eighteenth step of referring to the storing portion that stores, in advance as known sensitivity parameters of the optical sensor, a difference in received light quantity received by the optical sensor between the third state and the fourth state in addition to the reference pulse width of the drive pulse voltage, and calculating the received light quantities received by the optical sensor in the third and fourth states, based on the sensitivity parameters stored in the storing portion, the discharge probabilities calculated in the thirteenth and seventeenth steps, the pulse widths of the drive pulse voltage in the third and fourth states, and the discharge probabilities calculated in the ninth step.

Further, a received light quantity measuring method of a light detection system of the present disclosure includes: a first step of periodically applying a drive pulse voltage to an electrode of an optical sensor that detects light emitted from a first light source in a first state in which the optical sensor is shielded from the light; a second step of detecting a discharge current of the optical sensor in the first state; a third step of detecting a discharge of the optical sensor based on the discharge current in the first state; a fourth step of calculating a discharge probability in the first state based on the number of times of application of the drive pulse voltage applied in the first step and the number of times of discharge detected in the third step during the application of the drive pulse voltage; a fifth step of periodically applying the drive pulse voltage to the electrode of the optical sensor in a second state in which the optical sensor is shielded from the light and a pulse width of the drive pulse voltage is different from that of the first state; a sixth step of detecting a discharge current of the optical sensor in the second state; a seventh step of detecting a discharge of the optical sensor based on the discharge current in the second state; an eighth step of calculating a discharge probability in the second state based on the number of times of application of the drive pulse voltage applied in the fifth step and the number of times of discharge detected in the seventh step during the application of the drive pulse voltage; a ninth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth and eighth steps, and the pulse widths of the drive pulse voltage in the first and second states; a tenth step of periodically applying the drive pulse voltage to the electrode of the optical sensor in a third state in which light from a second light source having a known light quantity is incident on the optical sensor or the second light source is turned off; an eleventh step of detecting a discharge current of the optical sensor in the third state; a twelfth step of detecting a discharge of the optical sensor based on the discharge current in the third state; a thirteenth step of calculating a discharge probability in the third state based on the number of times of application of the drive pulse voltage applied in the tenth step and the number of times of discharge detected in the twelfth step during the application of the drive pulse voltage; a fourteenth step of periodically applying the drive pulse voltage to the electrode of the optical sensor in a fourth state in which a turning-on/turning-off state of the second light source is different from that of the third state and a pulse width of the drive pulse voltage is the same as that of the third state; a fifteenth step of detecting a discharge current of the optical sensor in the fourth state; a sixteenth step of detecting a discharge of the optical sensor based on the discharge current in the fourth state; a seventeenth step of calculating a discharge probability in the fourth state based on the number of times of application of the drive pulse voltage applied in the fourteenth step and the number of times of discharge detected in the sixteenth step during the application of the drive pulse voltage; an eighteenth step of periodically applying the drive pulse voltage to the electrode of the optical sensor in a fifth state in which the second light source is turned off and a pulse width of the drive pulse voltage is the same as that of the third and fourth states; a nineteenth step of detecting a discharge current of the optical sensor in the fifth state; a twentieth step of detecting a discharge of the optical sensor based on the discharge current in the fifth state; a twenty-first step of calculating a discharge probability in the fifth state based on the number of times of application of the drive pulse voltage applied in the eighteenth step and the number of times of discharge detected in the twentieth step during the application of the drive pulse voltage; and a twenty-second step of referring to the storing portion that stores, in advance as known sensitivity parameters of the optical sensor, a difference in received light quantity received by the optical sensor between the third state and the fourth state in addition to the reference pulse width of the drive pulse voltage, and calculating received light quantities received by the optical sensor in the third, fourth, and fifth states, based on the sensitivity parameters stored in the storing portion, the discharge probabilities calculated in the thirteenth, seventeenth, and twenty-first steps, the pulse widths of the drive pulse voltage in the third, fourth, and fifth states, and the discharge probabilities calculated in the ninth step.

Further, a received light quantity measuring method of a light detection system of the present disclosure includes: a first step of periodically applying a drive pulse voltage to an electrode of an optical sensor that detects light emitted from a first light source in a first state in which the optical sensor is shielded from the light; a second step of detecting a discharge current of the optical sensor in the first state; a third step of detecting a discharge of the optical sensor based on the discharge current in the first state; a fourth step of calculating a discharge probability in the first state based on the number of times of application of the drive pulse voltage applied in the first step and the number of times of discharge detected in the third step during the application of the drive pulse voltage; a fifth step of periodically applying the drive pulse voltage to the electrode of the optical sensor in a second state in which the optical sensor is shielded from the light and a pulse width of the drive pulse voltage is different from that of the first state; a sixth step of detecting a discharge current of the optical sensor in the second state; a seventh step of detecting a discharge of the optical sensor based on the discharge current in the second state; an eighth step of calculating a discharge probability in the second state based on the number of times of application of the drive pulse voltage applied in the fifth step and the number of times of discharge detected in the seventh step during the application of the drive pulse voltage; a ninth step of periodically applying the drive pulse voltage to the electrode of the optical sensor in a third state in which the optical sensor is shielded from the light and a pulse width of the drive pulse voltage is the same as that of either the first or second state or different from those of the first and second states; a tenth step of detecting a discharge current of the optical sensor in the third state; an eleventh step of detecting a discharge of the optical sensor based on the discharge current in the third state; a twelfth step of calculating a discharge probability in the third state based on the number of times of application of the drive pulse voltage applied in the ninth step and the number of times of discharge detected in the eleventh step during the application of the drive pulse voltage; a thirteenth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth, eighth, and twelfth steps, and the pulse widths of the drive pulse voltage in the first, second, and third states; a fourteenth step of periodically applying the drive pulse voltage to the electrode of the optical sensor in a fourth state in which light from a second light source having a known light quantity is incident on the optical sensor or the second light source is turned off; a fifteenth step of detecting a discharge current of the optical sensor in the fourth state; a sixteenth step of detecting a discharge of the optical sensor based on the discharge current in the fourth state; a seventeenth step of calculating a discharge probability in the fourth state based on the number of times of application of the drive pulse voltage applied in the fourteenth step and the number of times of discharge detected in the sixteenth step during the application of the drive pulse voltage; an eighteenth step of periodically applying the drive pulse voltage to the electrode of the optical sensor in a fifth state in which a turning-on/turning-off state of the second light source is different from that of the fourth state and a pulse width of the drive pulse voltage is the same as that of the fourth state; a nineteenth step of detecting a discharge current of the optical sensor in the fifth state; a twentieth step of detecting a discharge of the optical sensor based on the discharge current in the fifth state; a twenty-first step of calculating a discharge probability in the fifth state based on the number of times of application of the drive pulse voltage applied in the eighteenth step and the number of times of discharge detected in the twentieth step during the application of the drive pulse voltage; and a twenty-second step of referring to the storing portion that stores, in advance as known sensitivity parameters of the optical sensor, a difference in received light quantity received by the optical sensor between the fourth state and the fifth state in addition to the reference pulse width of the drive pulse voltage, and calculating the received light quantities received by the optical sensor in the fourth and fifth states, based on the sensitivity parameters stored in the storing portion, the discharge probabilities calculated in the seventeenth and twenty-first steps, the pulse widths of the drive pulse voltage in the fourth and fifth states, and the discharge probabilities calculated in the thirteenth step.

Further, a received light quantity measuring method of a light detection system of the present disclosure includes: a first step of periodically applying a drive pulse voltage to an electrode of an optical sensor that detects light emitted from a first light source in a first state in which the optical sensor is shielded from the light; a second step of detecting a discharge current of the optical sensor in the first state; a third step of detecting a discharge of the optical sensor based on the discharge current in the first state; a fourth step of calculating a discharge probability in the first state based on the number of times of application of the drive pulse voltage applied in the first step and the number of times of discharge detected in the third step during the application of the drive pulse voltage; a fifth step of periodically applying the drive pulse voltage to the electrode of the optical sensor in a second state in which the optical sensor is shielded from the light and a pulse width of the drive pulse voltage is different from that of the first state; a sixth step of detecting a discharge current of the optical sensor in the second state; a seventh step of detecting a discharge of the optical sensor based on the discharge current in the second state; an eighth step of calculating a discharge probability in the second state based on the number of times of application of the drive pulse voltage applied in the fifth step and the number of times of discharge detected in the seventh step during the application of the drive pulse voltage; a ninth step of periodically applying the drive pulse voltage to the electrode of the optical sensor in a third state in which the optical sensor is shielded from the light and a pulse width of the drive pulse voltage is the same as that of either the first or second state or different from those of the first and second states; a tenth step of detecting a discharge current of the optical sensor in the third state; an eleventh step of detecting a discharge of the optical sensor based on the discharge current in the third state; a twelfth step of calculating a discharge probability in the third state based on the number of times of application of the drive pulse voltage applied in the ninth step and the number of times of discharge detected in the eleventh step during the application of the drive pulse voltage; a thirteenth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth, eighth, and twelfth steps, and the pulse widths of the drive pulse voltage in the first, second, and third states; a fourteenth step of periodically applying the drive pulse voltage to the electrode of the optical sensor in a fourth state in which light from a second light source having a known light quantity is incident on the optical sensor or the second light source is turned off; a fifteenth step of detecting a discharge current of the optical sensor in the fourth state; a sixteenth step of detecting a discharge of the optical sensor based on the discharge current in the fourth state; a seventeenth step of calculating a discharge probability in the fourth state based on the number of times of application of the drive pulse voltage applied in the fourteenth step and the number of times of discharge detected in the sixteenth step during the application of the drive pulse voltage; an eighteenth step of periodically applying the drive pulse voltage to the electrode of the optical sensor in a fifth state in which a turning-on/turning-off state of the second light source is different from that of the fourth state and a pulse width of the drive pulse voltage is the same as that of the fourth state; a nineteenth step of detecting a discharge current of the optical sensor in the fifth state; a twentieth step of detecting a discharge of the optical sensor based on the discharge current in the fifth state; a twenty-first step of calculating a discharge probability in the fifth state based on the number of times of application of the drive pulse voltage applied in the eighteenth step and the number of times of discharge detected in the twentieth step during the application of the drive pulse voltage; a twenty-second step of periodically applying the drive pulse voltage to the electrode of the optical sensor in a sixth state in which the second light source is turned off and a pulse width of the drive pulse voltage is the same as that of the fourth and fifth states; a twenty-third step of detecting a discharge current of the optical sensor in the sixth state; a twenty-fourth step of detecting a discharge of the optical sensor based on the discharge current in the sixth state; a twenty-fifth step of calculating a discharge probability in the sixth state based on the number of times of application of the drive pulse voltage applied in the twenty-second step and the number of times of discharge detected in the twenty-fourth step during the application of the drive pulse voltage; and a twenty-sixth step of referring to the storing portion that stores, in advance as known sensitivity parameters of the optical sensor, a difference in received light quantity received by the optical sensor between the fourth state and the fifth state in addition to the reference pulse width of the drive pulse voltage, and calculating received light quantities received by the optical sensor in the fourth, fifth, and sixth states, based on the sensitivity parameters stored in the storing portion, the discharge probabilities calculated in the seventeenth, twenty-first, and twenty-fifth steps, the pulse widths of the drive pulse voltage in the fourth, fifth, and sixth states, and the discharge probabilities calculated in the thirteenth step.

According to the present disclosure, by providing an application voltage generating portion, a current detecting portion, a discharge determining portion, a first discharge probability calculating portion, a storing portion, and a second discharge probability calculating portion, it is possible to calculate a discharge probability of a first type irregular discharge caused by a noise component other than a discharge occurring due to a photoelectric effect of an optical sensor, which occurs depending on a pulse width of a drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor. As a result, in the present disclosure, it is possible to implement a life determination of the optical sensor based on these discharge probabilities of the irregular discharge.

Further, in the present disclosure, by further providing a second light source, a light source control portion, and a received light quantity calculating portion, even when at least one of the discharge probability of the regular discharge and the discharge probability of the irregular discharge that occurs without depending on the pulse width of the drive pulse voltage and that occurs depending on the received light quantity received by the optical sensor is an unknown number, it is possible to calculate a received light quantity. As a result, in the present disclosure, it is possible to accurately detect the presence or absence of a flame by using the obtained received light quantity. Further, in the present disclosure, it is possible to reduce the possibility that the life of the optical sensor is erroneously determined by using the received light quantity.

DETAILED DESCRIPTION OF THE INVENTION

Embodiment

Figure 1:
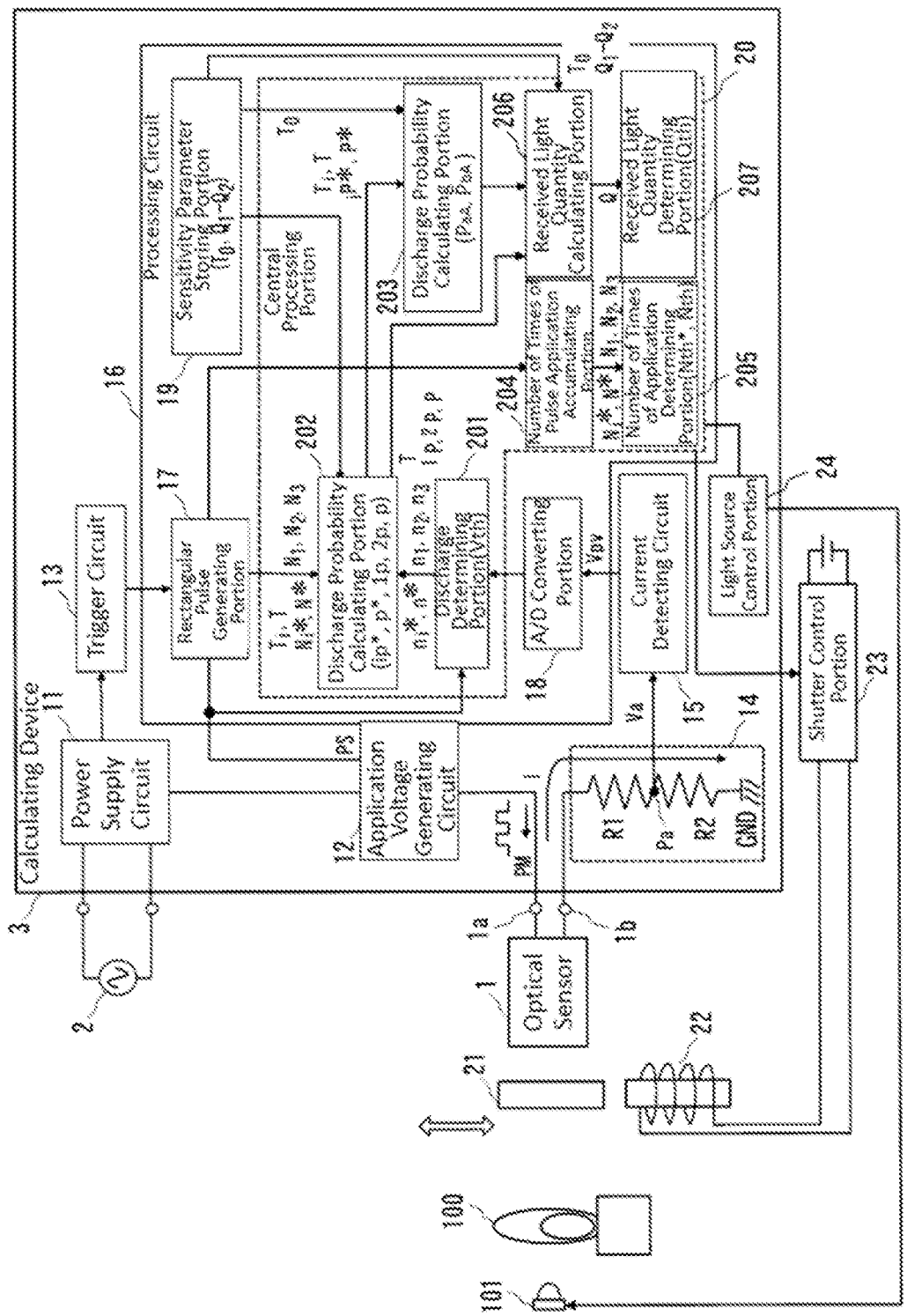
FIG. 1 is a block diagram illustrating a configuration of a light detection system according to an embodiment of the present disclosure.

Hereinafter, a method of measuring an irregular discharge caused by a noise component and a method of measuring a received light quantity will be described. An optical sensor using a photoelectric effect is a photoelectric tube, which is energized by a photon hitting an electrode. The energization proceeds under the following conditions.

[Operation of Optical Sensor]

When a photon hits one of the electrodes in a state in which a voltage is applied between a pair of electrodes of an optical sensor, photoelectrons are emitted at a certain probability, and an electron avalanche of electrons is produced to cause energization (a discharge current flows between the electrodes).

While a voltage is applied between the electrodes, the optical sensor continues to be energized. Alternatively, when the energization of the optical sensor is confirmed, the voltage is lowered immediately, so that the energization is stopped. As described above, when the voltage between the electrodes decreases, the optical sensor terminates the energization.

When one photon hits the electrode of the optical sensor, the probability that the optical sensor discharges is defined as $P_1$.

Further, when two photons hit the electrode of the optical sensor, the probability that the optical sensor discharges is defined as $P_2$. Since $P_2$ is opposite to the probability that neither the first photon nor the second photon discharges, a relationship between $P_2$ and $P_1$ is expressed by Expression (1).

$$(1-P_2)=(1-P_1)^2 \qquad (1)$$

In general, where $P_n$ is the probability that the optical sensor discharges when n photons hit the electrode of the optical sensor, and $P_m$ is the probability that the optical sensor discharges when m photons hit the electrode of the optical sensor (n and m are natural numbers), Expressions (2) and (3) are satisfied in the same manner as Expression (1).

$$(1-P_n)=(1-P_1)^n \qquad (2)$$

$$(1-P_m)=(1-P_1)^m \qquad (3)$$

From Expressions (2) and (3), Expression (4) is derived as a relationship between $P_n$ and $P_m$.

$$(1-P_n)^{\frac{1}{n}} = (1-P_m)^{\frac{1}{m}} \qquad (4)$$
$$(1-P_n)^{\frac{m}{n}} = (1-P_m)$$
$$\frac{m}{n} = \log_{(1-P_n)}(1-P_m)$$

Where E is the number of photons coming to the electrode of the optical sensor per unit time, and T is the time duration during which a voltage equal to or higher than a discharge starting voltage from the optical sensor is applied between the electrodes (hereinafter referred to as a "pulse width"), the number of photons that hit the electrode per every application of the voltage is expressed by ET. Accordingly, a relationship among the number of photons E, the pulse width T, and a discharge probability P when the same optical sensor is operated under a condition B which is different from a certain condition A is expressed by the following Expression (5). Here, when the number of photons to be used as a reference is defined as $E_0$ to establish $Q=E/E_0$, Expression (6) is obtained. Here, Q is referred to as a "received light quantity".

$$\frac{E_B T_B}{E_A T_A} = \log_{(1-P_A)}(1-P_B) \qquad (5)$$

$$\frac{Q_B T_B}{Q_A T_A} = \log_{(1-P_A)}(1-P_B) \qquad (6)$$

[Configuration and Operation of Light Detection System]

FIG. 1 is a block diagram illustrating a configuration of the light detection system according to the embodiment of the present disclosure. The light detection system is configured to drive the optical sensor and calculate the discharge probability and the received light quantity from the light source based on a result of the driving of the optical sensor. The light detection system includes an optical sensor 1 configured to detect light (ultraviolet rays) generated from a light source 100 (a first light source), such as a flame, an LED, a lamp, or the like, an external power supply 2, a calculating device 3 to which the optical sensor 1 and the external power supply 2 are connected to each other, a shutter 21 provided between the light source 100 and the optical sensor 1, a shutter drive portion 22 for driving the shutter 21, a shutter control portion 23 for controlling the shutter 21 through the shutter drive portion 22, and an additional light source 101 (a second light source) installed such that the generated light is incident on the optical sensor 1 together with the light from the light source 100. The shutter 21 and the shutter drive portion 22 constitute light shielding means.

The optical sensor 1 is composed of a photoelectric tube including a cylindrical envelope having both end portions closed, two electrode supporting pins passing through both end portions of the envelope, and two electrodes supported in parallel with each other by the electrode supporting pins inside the envelope. In such an optical sensor 1, when one electrode disposed opposite to the light source 100 is irradiated with ultraviolet rays in a state in which a predetermined voltage is applied between the electrodes via the electrode supporting pins, electrons are emitted from the electrode by the photoelectric effect, and a discharge current flows between the electrodes.

The external power supply 2 is made of, for example, an AC commercial power supply having a voltage value of 100 [V] or 200 [V].

The calculating device 3 includes a power supply circuit 11 connected to the external power supply 2, an application voltage generating circuit 12 and a trigger circuit 13 connected to the power supply circuit 11, a voltage dividing resistor 14 constituted by resistors R1 and R2 which are connected in series between a terminal 1*b* on the downstream side of the optical sensor 1 and a ground line GND, a current detecting circuit 15 configured to detect a voltage (reference voltage) Va generated at a connection point Pa between the resistors R1 and R2 of the voltage dividing resistor 14 as a current I flowing to the optical sensor 1, a processing circuit 16 to which the application voltage generating circuit 12, the trigger circuit 13, and the current detecting circuit 15 are connected, and a light source control portion 24 that controls turning-on/turning-off of the additional light source 101.

The power supply circuit 11 supplies AC power input from the external power supply 2 to the application voltage generating circuit 12 and the trigger circuit 13. Further, the power for driving the calculating device 3 is acquired from the power supply circuit 11. However, a configuration in which the power for driving is acquired from another power supply independently of AC/DC is also applicable.

Figure 2:
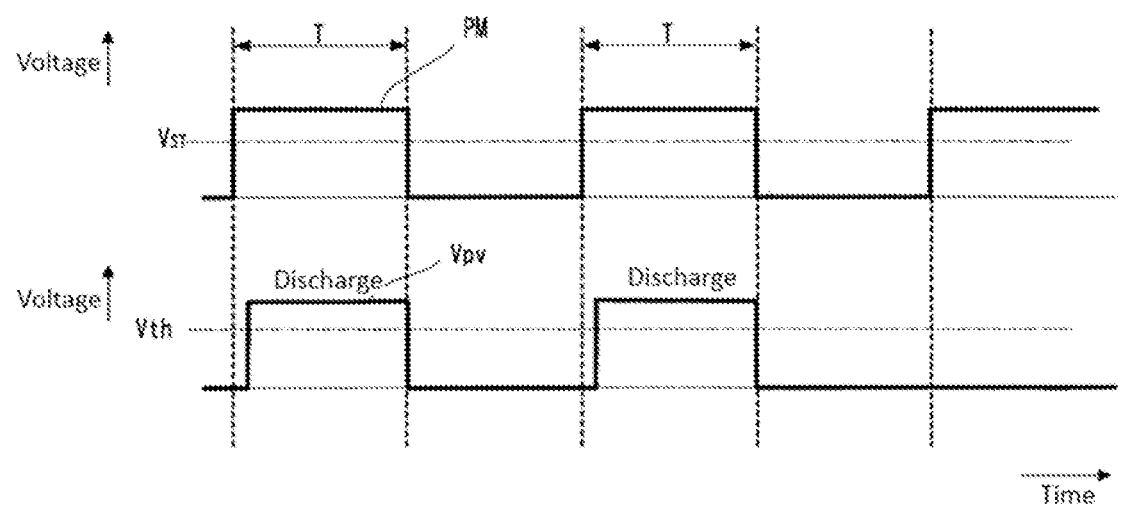
FIG. 2 is a waveform diagram illustrating a drive pulse applied to an optical sensor and a detected voltage detected in a current detecting circuit in the embodiment of the present disclosure.

The application voltage generating circuit 12 (application voltage generating portion) boosts the AC voltage applied by the power supply circuit 11 to a predetermined value to apply the voltage to the optical sensor 1. In the present embodiment, a pulse voltage (a voltage equal to or higher than a discharge starting voltage $V_{ST}$ of the optical sensor 1) of 200 [V] synchronized with a rectangular pulse PS from the processing circuit 16 is generated as a drive pulse voltage PM, and the generated drive pulse voltage PM is applied to the optical sensor 1. FIG. 2 illustrates the drive pulse voltage PM applied to the optical sensor 1. The drive pulse voltage PM is synchronized with the rectangular pulse PS from the processing circuit 16, and a pulse width T thereof is equal to a pulse width of the rectangular pulse PS. The rectangular pulse PS from the processing circuit 16 will be described later.

The trigger circuit 13 detects a predetermined value point of the AC voltage applied by the power supply circuit 11 and inputs a result of the detection to the processing circuit 16. In the present embodiment, the trigger circuit 13 detects a minimum value point at which the voltage value is minimum as a predetermined value point (triggering time point). Detection of one cycle of the AC voltage is enabled by detecting a predetermined value point of the AC voltage in this manner.

The voltage dividing resistor 14 generates a reference voltage Va as a divided voltage of the resistors R1 and R2 and inputs the reference voltage Va to the current detecting circuit 15. Here, since a voltage value of the drive pulse PM applied to a terminal 1*a* on an upstream side of the optical sensor 1 is as high as 200 [V] as described above, when a voltage generated at the terminal 1*b* on the downstream side when a current flows between the electrodes of the optical sensor 1 is input to the current detecting circuit 15 as is, a large load is applied to the current detecting circuit 15. Therefore, in the present embodiment, a reference voltage Va having a low voltage value is generated by the voltage dividing resistor 14, and the reference voltage Va is input to the current detecting circuit 15.

The current detecting circuit 15 (current detecting portion) detects a reference voltage Va input from the voltage dividing resistor 14 as a discharge current I from the optical sensor 1 and inputs the detected reference voltage Va to the processing circuit 16 as a detected voltage Vpv.

The processing circuit 16 includes a rectangular pulse generating portion 17, an A/D converting portion 18, a sensitivity parameter storing portion 19, and a central processing portion 20.

The rectangular pulse generating portion 17 generates a rectangular pulse PS having a pulse width T every time when the trigger circuit 13 detects a triggering time point, that is, at every cycle of the AC voltage applied to the trigger circuit 13 from the power supply circuit 11. The rectangular pulse PS generated by the rectangular pulse generating portion 17 is sent to the application voltage generating circuit 12. The rectangular pulse generating portion 17 and the application voltage generating circuit 12 can adjust the pulse width of the drive pulse voltage PM. That is, by setting the pulse width of the rectangular pulse PS to a desired value by the rectangular pulse generating portion 17, the drive pulse voltage PM having a pulse width equal to that of the rectangular pulse PS is output from the application voltage generating circuit 12.

The A/D converting portion 18 performs A/D conversion on the detected voltage Vpv from the current detecting circuit 15 and sends the converted detected voltage Vpv to the central processing portion 20.

The central processing portion 20 is implemented by hardware constituted by a processor or a storage device and a program configured to achieve various functions in cooperation with the hardware, and functions as a discharge determining portion 201, discharge probability calculating portions 202 and 203, a number-of-times-of-pulse-application accumulating portion 204, a number-of-times-of-application determining portion 205, a received light quantity calculating portion 206, and a received light quantity determining portion 207.

In the central processing portion 20, the discharge determining portion 201 detects the discharge of the optical sensor 1 based on the discharge current from the optical sensor 1 detected by the current detecting circuit 15. Specifically, each time the drive pulse voltage PM is applied to the optical sensor 1 (each time the rectangular pulse PS is generated), the discharge determining portion 201 compares a detected voltage Vpv input from the A/D converting portion 18 with a threshold voltage Vth determined in advance (see FIG. 2), and determines that the optical sensor 1 has discharged when the detected voltage Vpv exceeds the threshold voltage Vth and increments the number of times of discharge n by one.

When the number of times of application N of the drive pulse voltage PM applied to the optical sensor 1 exceeds a predetermined number (when the number of pulses of the rectangular pulse PS exceeds a predetermined number), the discharge probability calculating portion 202 calculates the discharge probability P of the optical sensor 1 based on the number of times of discharge n detected by the discharge determining portion 201 and the number of times of application N of the drive pulse voltage PM.

The discharge probability P is output as a flame signal. It is assumed that a certain operation condition, that is, a received light quantity $Q_0$ ($Q_0 \neq 0$) and a discharge probability $P_0$ at a pulse width $T_0$ are known. For example, a shipping inspection of the light detection system includes a method of measuring the discharge probability P in predetermined received light quantity and pulse width. At this time, the relationship among the received light quantity Q, the pulse width T, and the discharge probability P is expressed by Expression (7). However, P=0 is assumed to be Q=0. In the present disclosure, cases where P=0 and P=1 are excluded from calculation processing of the received light quantity Q.

$$\frac{QT}{Q_0 T_0} = \log_{(1-P_0)}(1-P) \quad (7)$$

Now, $Q_0$, $T_0$, and $P_0$ are known, and T is known because T is a pulse width controlled by the light detection system. By applying the drive pulse voltages PM to the optical sensor 1 by a plurality of times, measuring the number of times of discharge n, and calculating the discharge probability P, the received light quantity Q which is an unknown number can be calculated from Expression (7). The received light quantity Q may be output as a flame signal.

[Operation of Light Detection System Taking Noise into Account]

From Expression (7), when it is assumed that a discharge probability $P_{aA}$, in a certain operation condition, that is, with a received light quantity $Q_0$ and a pulse width $T_0$, is known, the relationship among the received light quantity Q, the pulse width T, and the discharge probability P is given by Expression (8).

$$(1-P) = (1-P_{aA})^{\frac{QT}{Q_0 T_0}} \quad (8)$$

The relationship between the discharge of the optical sensor 1 and time is considered to be of two types given below.
(a) Discharge appearing at a uniform probability during an application of the drive pulse voltage PM (Expression (8)).
(b) Discharge appearing at a rising edge or a falling edge of the drive pulse voltage PM.

Next, the relationship between the discharge of the optical sensor 1 and the received light quantity is considered to be of two types given below.
(A) Discharge appearing in accordance with the relationship between the received light quantity and Expression (8).
(B) Discharge which appears independently of the received light quantity.

TABLE 1

| | | Relationship between Discharge Probability and Time | |
|---|---|---|---|
| | | Follows Expression (8) a | Discharges at a rising edge/falling edge of the application voltage b |
| Relationship between Discharge Probability and Light Quantity | Follows Expression (8) (The discharge probability per photon is constant irrespective of the light quantity) A | aA | bA |
| | Discharges independently of the light quantity B | aB | bB |

As in a matrix in Table 1, the noise discharge of the optical sensor 1 can be classified by the combination of (a), (b) and (A), (B). In the present disclosure, it is considered that a high possibility of observation is achieved in a combination (aA) of (a) and (A), a combination (aB) of (a) and (B), a combination (bA) of (b) and (A), and a combination (bB) of (b) and (B).

The discharge of the combination of aA is called "sensitivity" and is a normal discharge (which has been incorporated into Expression (8)). The discharge of the combination of aB is a discharge that is independent of a quantity of the ultraviolet rays which may be triggered by thermal electrons or the like. The discharge of the combination of bA is a discharge that depends on the light quantity among the discharges which occur in a limited way at a rising edge or falling edge of the drive pulse voltage due to an inrush current and residual ions. The discharge of the combination of bB is a discharge that does not depend on the light quantity among discharges which occur in a limited way at a rising edge or falling edge of the drive pulse voltage due to the inrush current and the residual ions.

It should be noted that the types classified in Table are not all the UV (ultraviolet) failure modes. For example, there are failure modes not included in Table 1, such as modes in which a discharge does not end and sensitivity wavelengths are different.

The discharge of aA and the noise discharge of the three types of aB, bA, and bB can be expressed in the form of the following Expression (9).

$$(1-P) = (1-P_{aA})^{\frac{QT}{Q_0 T_0}} \cdot (1-P_{aB})^{\frac{T}{T_0}} \cdot (1-P_{bA})^{\frac{Q}{Q_0}} \cdot (1-P_{bB}) \quad (9)$$

In Expression (9), $P_{aB}$ is a discharge probability of aB with the received light quantity Q and the pulse width T, $P_{bA}$ is a discharge probability of bA with the received light quantity Q and the pulse width T, and $P_{bB}$ is a discharge probability of bB with the received light quantity Q and the pulse width T.

[Calculating Method of Discharge Probabilities $P_{aA}$, $P_{bA}$, $P_{aB}$, and $P_{bB}$]

In addition to the light source 100, in a case where the received light quantity when the additional light source 101 having a known light quantity is turned on is defined as $Q_1$, and the received light quantity with only the light source 100 in a state where the additional light source 101 is turned off is defined as $Q_2$ ($Q_1 \neq Q_2$), since the difference between the received light quantities $Q_1$ and $Q_2$ is the light quantity of the additional light source 101, even when the received light quantities $Q_1$ and $Q_2$ are unknown values, $Q_1 - Q_2$ is a known value. By using the discharge probability when the received light quantity is $Q_1$ as $^1P$ and substituting the received light quantity $Q_1$ and the discharge probability $^1P$ into Expression (9), Expression (10) is obtained.

$$(1 - {}^1P) = (1 - P_{aA})^{\frac{Q_1 T}{Q_0 T_0}} \cdot (1 - P_{aB})^{\frac{T}{T_0}} \cdot (1 - P_{bA})^{\frac{Q_1}{Q_0}} \cdot (1 - P_{bB}) \quad (10)$$

Further, by using the discharge probability when the received light quantity is $Q_2$ as $^2P$ and substituting the received light quantity $Q_2$ and the discharge probability $^2P$ into Expression (9), Expression (11) is obtained.

$$(1 - {}^2P) = (1 - P_{aA})^{\frac{Q_2 T}{Q_0 T_0}} \cdot (1 - P_{aB})^{\frac{T}{T_0}} \cdot (1 - P_{bA})^{\frac{Q_2}{Q_0}} \cdot (1 - P_{bB}) \quad (11)$$

When Expression (10) is divided by Expression (11), Expression (12) is obtained.

$$\frac{1 - {}^1P}{1 - {}^2P} = \left((1 - P_{aA})^{\frac{T}{T_0}} \cdot (1 - P_{bA})\right)^{\frac{Q_1 - Q_2}{Q_0}} \quad (12)$$

Further, where $^1_1P$ is the discharge probability when the pulse width of the drive pulse voltage PM is $T_1$ and the received light quantity is $Q_1$, and $^2_1P$ is the discharge probability when the pulse width of the drive pulse voltage PM is $T_1$ and the received light quantity is $Q_2$, Expression (13) is obtained from Expression (12).

$$\frac{1 - {}^1_1P}{1 - {}^2_1P} = \left((1 - P_{aA})^{\frac{T_1}{T_0}} \cdot (1 - P_{bA})\right)^{\frac{Q_1 - Q_2}{Q_0}} \quad (13)$$

Further, where $^1_2P$ is the discharge probability when the pulse width of the drive pulse voltage PM is $T_2$ ($T_1 \neq T_2$) and the received light quantity is $Q_1$, and $^2_2P$ is the discharge probability when the pulse width of the drive pulse voltage PM is $T_2$ and the received light quantity is $Q_2$, Expression (14) is obtained from Expression (12).

$$\frac{1 - {}^1_2P}{1 - {}^2_2P} = \left((1 - P_{aA})^{\frac{T_2}{T_0}} \cdot (1 - P_{bA})\right)^{\frac{Q_1 - Q_2}{Q_0}} \quad (14)$$

The notations of each of the discharge probabilities when the received light quantities $Q_1$ and $Q_2$, and the pulse widths $T_1$ and $T_2$, are combined and measured, are summarized in Table 2.

TABLE 2

|  | Light Quantity $Q_1$ | Light Quantity $Q_2$ |
|---|---|---|
| Pulse Width $T_1$ | $^1_1P$ | $^2_1P$ |
| Pulse Width $T_2$ | $^1_2P$ | $^2_2P$ |

When Expression (13) is divided by Expression (14) and modified, the discharge probability $P_{aA}$ can be obtained as in Expression (16).

$$\frac{1 - {}^1_1P}{1 - {}^2_1P} \cdot \frac{1 - {}^2_2P}{1 - {}^1_2P} = (1 - P_{aA})^{\frac{(T_1 - T_2)(Q_1 - Q_2)}{Q_0 T_0}} \quad (15)$$

$$P_{aA} = 1 - \left(\frac{1 - {}^1_1P}{1 - {}^2_1P} \cdot \frac{1 - {}^2_2P}{1 - {}^1_2P}\right)^{\frac{Q_0 T_0}{(T_1 - T_2)(Q_1 - Q_2)}} \quad (16)$$

Further, by substituting Expression (16) into Expression (12), the discharge probability $P_{bA}$ can be obtained as in Expression (17).

$$\frac{1 - {}^1P}{1 - {}^2P} = \left(\frac{1 - {}^1_1P}{1 - {}^2_1P} \cdot \frac{1 - {}^2_2P}{1 - {}^1_2P}\right)^{\frac{T}{(T_1 - T_2)}} \cdot (1 - P_{bA})^{\frac{Q_1 - Q_2}{Q_0}} \quad (17)$$

$$\left(\left(\frac{1 - {}^1_1P}{1 - {}^2_1P} \cdot \frac{1 - {}^2_2P}{1 - {}^1_2P}\right)^{-\frac{T}{(T_1 - T_2)}} \cdot \frac{1 - {}^1P}{1 - {}^2P}\right)^{\frac{Q_0}{Q_1 - Q_2}} = 1 - P_{bA}$$

$$P_{bA} = 1 - \left(\left(\frac{1 - {}^1_1P}{1 - {}^2_1P} \cdot \frac{1 - {}^2_2P}{1 - {}^1_2P}\right)^{-\frac{T}{(T_1 - T_2)}} \cdot \frac{1 - {}^1P}{1 - {}^2P}\right)^{\frac{Q_0}{Q_1 - Q_2}}$$

Therefore, by measuring each of the discharge probabilities $^1_1P$, $^2_1P$, $^1_2P$, $^2_2P$, $^1P$, and $^2P$, the discharge probabilities $P_{aA}$ and $P_{bA}$ can be obtained.

Next, in a case where the light is not received in Expression (9) (for example, when a shutter is closed), when the received light quantity $Q$ is 0, Expression (18) is obtained. Here, $_nP^*$ is a discharge probability measurement value in a case where the light is not received when the pulse width is $T_n$.

$$(1 - {}_nP^*) = (1 - P_{aB})^{\frac{T_n}{T_0}} \cdot (1 - P_{bB}) \quad (18)$$

The measurement is performed with the pulse width $T_1$ and the discharge probability $_1P^*$ is measured.

$$(1 - {}_1P^*) = (1 - P_{aB})^{\frac{T_1}{T_0}} \cdot (1 - P_{bB}) \quad (19)$$

Further, the measurement is performed with the pulse width $T_2$ ($T_1 \neq T_2$), and the discharge probability $_2P^*$ is measured.

$$(1 - {}_2P^*) = (1 - P_{aB})^{\frac{T_2}{T_0}} \cdot (1 - P_{bB}) \quad (20)$$

When Expression (19) is divided by Expression (20), Expression (21) is obtained, so that the discharge probability $P_{aB}$ can be calculated as in Expression (22).

$$\frac{1 - {}_1P^*}{1 - {}_2P^*} = (1 - P_{aB})^{\frac{T_1 - T_2}{T_0}} \quad (21)$$

$$P_{aB} = 1 - \left(\frac{1 - {}_1P^*}{1 - {}_2P^*}\right)^{\frac{T_0}{T_1 - T_2}} \quad (22)$$

When Expression (22) is substituted into an expression, in which the discharge probability measurement value in a case where the light is not received when the pulse width is T in Expression (18) is defined as P, the discharge probability $P_{bB}$ can be calculated as in Expression (23).

$$(1 - P^*) = \left(\frac{1 - {}_1P^*}{1 - {}_2P^*}\right)^{\frac{T}{T_1 - T_2}} \cdot (1 - P_{bB}) \quad (23)$$

$$(1 - P_{bB}) = \left(\frac{1 - {}_2P^*}{1 - {}_1P^*}\right)^{\frac{T}{T_1 - T_2}} \cdot (1 - P^*)$$

$$P_{bB} = 1 - \left(\frac{1 - {}_2P^*}{1 - {}_1P^*}\right)^{\frac{T}{T_1 - T_2}} \cdot (1 - P^*)$$

Therefore, in the case where the light is not received, when the discharge probabilities ${}_1P^*$ and ${}_2P^*$ with the pulse widths $T_1$ and $T_2$ are measured respectively, the discharge probabilities $P_{aB}$ and $P_{bB}$ can be obtained.

Note that $T = T_1$ may be set. The discharge probability $P_{bB}$ in this case can be obtained as in Expression (24).

$$P_{bB} = 1 - \left(\frac{1 - {}_2P^*}{1 - {}_1P^*}\right)^{\frac{T_1}{T_1 - T_2}} \cdot (1 - {}_1P^*) \quad (24)$$

Further, $T = T_2$ may be set. The discharge probability $P_{bB}$ in this case can be obtained as in Expression (25).

$$P_{bB} = 1 - \left(\frac{1 - {}_2P^*}{1 - {}_1P^*}\right)^{\frac{T_2}{T_1 - T_2}} \cdot (1 - {}_2P^*) \quad (25)$$

[Calculating Method of Received Light Quantity Q]

By modifying Expression (9) and substituting Expressions (16) and (17) into Expression (9), the received light quantity Q can be obtained as in Expression (26).

$$(1 - P) = \left(\frac{1 - {}_1P}{1 - {}_2P} \cdot \frac{1 - {}_2P}{1 - {}_1P}\right)^{\frac{QT}{(T_1 - T_2)(Q_1 - Q_2)}} \cdot (1 - P_{aB})^{\frac{T}{T_0}} \cdot \quad (26)$$

$$\left(\left(\frac{1 - {}_1P}{1 - {}_2P} \cdot \frac{1 - {}_2P}{1 - {}_1P}\right)^{-\frac{T}{(T_1 - T_2)}} \cdot \frac{1 - {}_1P}{1 - {}_2P}\right)^{\frac{Q}{Q_1 - Q_2}} \cdot (1 - P_{bB})$$

$$\frac{1 - P}{(1 - P_{aB})^{\frac{T}{T_0}} \cdot (1 - P_{bB})} =$$

-continued $$\left(\left(\frac{1 - {}_1P}{1 - {}_2P} \cdot \frac{1 - {}_2P}{1 - {}_1P}\right)^{\frac{T}{(T_1 - T_2)}} \cdot \left(\left(\frac{1 - {}_1P}{1 - {}_2P} \cdot \frac{1 - {}_2P}{1 - {}_1P}\right)^{-\frac{T}{(T_1 - T_2)}} \cdot \frac{1 - {}_1P}{1 - {}_2P}\right)\right)^{\frac{Q}{Q_1 - Q_2}}$$

$$\frac{1 - P}{(1 - P_{aB})^{\frac{T}{T_0}} \cdot (1 - P_{bB})} = \left(\frac{1 - {}_1P}{1 - {}_2P}\right)^{\frac{Q}{Q_1 - Q_2}}$$

$$Q = (Q_1 - Q_2) \cdot \log_{\frac{1 - {}_1P}{1 - {}_2P}} \frac{1 - P}{(1 - P_{aB})^{\frac{T}{T_0}} \cdot (1 - P_{bB})}$$

Therefore, even when at least one of the discharge probabilities $P_{aA}$ and $P_{bA}$ is an unknown number, by using an additional light source 101 having a known light quantity in addition to the light source 100 to be detected, the received light quantity Q can be obtained as in Expression (26).

As described above, in a case where the received light quantity when there is only the light source 100 in a state where the additional light source 101 is turned off, is $Q_2$, the received light quantity Q also can be obtained as in Expression (27).

$$Q = (Q_1 - Q_2) \cdot \log_{\frac{1 - {}_1P}{1 - {}_2P}} \frac{1 - {}_2P}{(1 - P_{aB})^{\frac{T}{T_0}} \cdot (1 - P_{bB})} \quad (27)$$

On the contrary, in a case where the received light quantity when there is only the light source 100 in a state where the additional light source 101 is turned off, is $Q_1$, the received light quantity Q also can be obtained as in Expression (28).

$$Q = (Q_1 - Q_2) \cdot \log_{\frac{1 - {}_1P}{1 - {}_2P}} \frac{1 - {}_1P}{(1 - P_{aB})^{\frac{T}{T_0}} \cdot (1 - P_{bB})} \quad (28)$$

Figure 3:
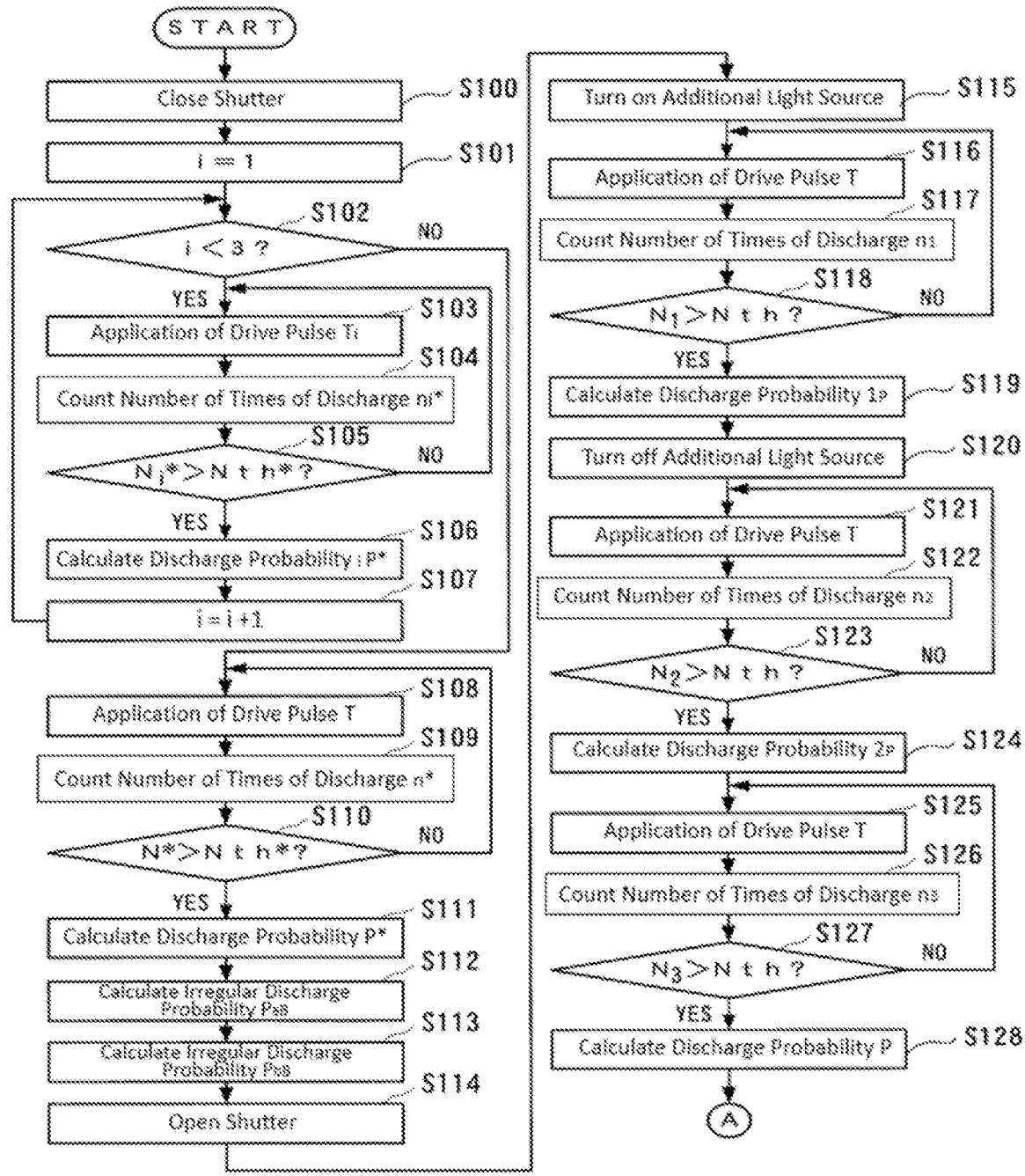
FIG. 3 is a flowchart explaining an operation of the light detection system according to the embodiment of the present disclosure.
Figure 4:
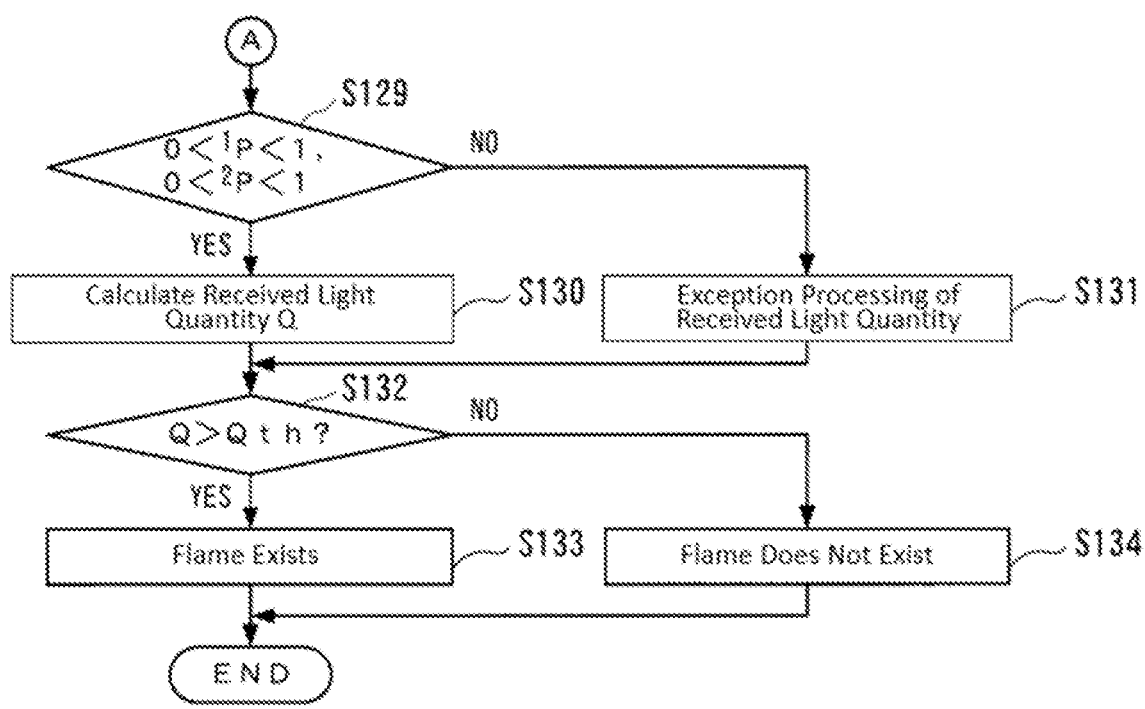
FIG. 4 is a flowchart explaining an operation of the light detection system according to the embodiment of the present disclosure.

Hereinafter, an operation of the light detection system of the present embodiment will be described in more detail. FIGS. 3 and 4 are flowcharts explaining the operation of the light detection system according to the present embodiment.

The shutter control portion 23 selectively outputs a shutter open signal (voltage) for causing the shutter 21 to perform an opening and closing operation, thereby switching between a state in which the shutter is closed (a state in which the optical sensor 1 is shielded from light) and a state in which the shutter is opened (a state in which the optical sensor 1 can receive light) is achieved.

In the present embodiment, the shutter open signal is not output in an initial state at the time of shipping inspection of the light detection system or at the site where the light detection system is installed. Therefore, the shutter drive portion 22 closes the shutter 21 (step S100 in FIG. 3). Accordingly, the light from the light source 100 is blocked by the shutter 21, and the light incident on the optical sensor 1 is blocked.

The discharge probability calculating portion 202 initializes a variable i for a pulse width control to 1 (step S101 in FIG. 3). When the variable i is smaller than (YES in step S102 in FIG. 3), the discharge probability calculating portion 202 instructs the rectangular pulse generating portion 17 to start an application of the drive pulse voltage PM.

In response to the instruction from the discharge probability calculating portion 202, the rectangular pulse generating portion 17 sets the pulse width of the rectangular pulse PS to a predetermined value $T_i=T_1$. By setting the pulse width, the application voltage generating circuit 12 applies the drive pulse voltage PM having the pulse width $T_i=T_1$ between a pair of terminals 1a and 1b of the optical sensor 1 (step S103 in FIG. 3).

The discharge determining portion 201 compares the detected voltage Vpv from the current detecting circuit 15 with a threshold voltage Vth determined in advance and determines that the optical sensor 1 discharges when the detected voltage Vpv exceeds the threshold voltage Vth. When it is determined that the optical sensor 1 discharges, the discharge determining portion 201 counts the number of times of discharge $n_i^*=n_1^*$ with the discharge as one time (step S104 in FIG. 3). Needless to say, an initial value of the number of times of discharge $n_1^*$ and an initial value of the number of times of application $N_1^*$ of the drive pulse voltage PM to be described later are both 0. In this manner, the processes in steps S103 and S104 are repeatedly executed.

The number-of-times-of-pulse-application accumulating portion 204 counts the rectangular pulse PS output from the rectangular pulse generating portion 17 to count the number of times of application $N_i^*$ of the drive pulse voltage PM.

The number-of-times-of-application determining portion 205 compares the number of times of application $N_i^*$ of the drive pulse voltage PM with a predetermined number Nth*.

When the number-of-times-of-application determining portion 205 determines that the number of times of application $N_i^*=N_1^*$ of the drive pulse voltage PM from the start of application of the drive pulse voltage PM having a pulse width $T_i=T_1$ in step S103 exceeds the predetermined number Nth* (YES in step S105 in FIG. 3), the discharge probability calculating portion 202 calculates the discharge probability $_1P^*$ based on the number of times of application $N_i^*=N_1^*$ of the drive pulse voltage PM at this time and the number of times of discharge $n_i^*=n_1^*$ detected by the discharge determining portion 201 by Expression (29) (step S106 in FIG. 3).

$$_1P^*=n_1^*/N_1^* \quad (29)$$

After the discharge probability $_1P^*$ is calculated, the discharge probability calculating portion 202 increments the variable i for a pulse width control by 1 (step S107 in FIG. 3). When the variable i is smaller than 3 (YES in step S102), the discharge probability calculating portion 202 instructs the rectangular pulse generating portion 17 to start the application of the drive pulse voltage PM again.

In response to the instruction from the discharge probability calculating portion 202, the rectangular pulse generating portion 17 temporarily stops the output of the rectangular pulse PS, and then sets the pulse width of the rectangular pulse PS to a predetermined value $T_i=T_2$ ($T_1 \neq T_2$). By setting the pulse width, the application voltage generating circuit 12 applies the drive pulse voltage PM having the pulse width $T_i=T_2$ between a pair of terminals 1a and 1b of the optical sensor 1 (step S103).

The discharge determining portion 201 compares the detected voltage Vpv from the current detecting circuit 15 with the threshold voltage Vth the same as above, and determines that the optical sensor 1 discharges when the detected voltage Vpv exceeds the threshold voltage Vth and increments the number of times of discharge $n_i^*=n_2^*$ by one (step S104). An initial value of the number of times of discharge $n_2^*$ and an initial value of the number of times of application $N_2^*$ of the drive pulse voltage PM are both 0. In this manner, the processes in steps S103 and S104 are repeatedly executed.

When the number-of-times-of-application determining portion 205 determines that the number of times of application $N_i^*=N_2^*$ of the drive pulse voltage PM from the start of application of the drive pulse voltage PM having a pulse width $T_i=T_2$ in step S103 exceeds the predetermined number Nth* (YES in step S105), the discharge probability calculating portion 202 calculates the discharge probability $_2P^*$ based on the number of times of application $N_i^*=N_2^*$ of the drive pulse voltage PM at this time and the number of times of discharge $n_i^*=n_2^*$ detected by the discharge determining portion 201 by Expression (30) (step S106).

$$_2P^*=n_2^*/N_2^* \quad (30)$$

After the discharge probability $_2P^*$ is calculated, the discharge probability calculating portion 202 increments the variable i for a pulse width control by 1 (step S107).

When the variable i reaches 3 (NO in step S102), the discharge probability calculating portion 202 instructs the rectangular pulse generating portion 17 to start the application of the drive pulse voltage PM again.

In response to the instruction from the discharge probability calculating portion 202, the rectangular pulse generating portion 17 temporarily stops the output of the rectangular pulse PS, and then sets the pulse width of the rectangular pulse PS to a predetermined value T. By setting the pulse width, the application voltage generating circuit 12 applies the drive pulse voltage PM having the pulse width T between a pair of terminals 1a and 1b of the optical sensor 1 (step S108 in FIG. 3).

Same as above, the discharge determining portion 201 determines that the optical sensor 1 discharges when the detected voltage Vpv from the current detecting circuit 15 exceeds the threshold voltage Vth and increments the number of times of discharge n* by one (step S109 in FIG. 3). An initial value of the number of times of discharge n* and an initial value of the number of times of application N* of the drive pulse voltage PM are both 0. In this manner, the processes in steps S108 and S109 are repeatedly executed.

When the number-of-times-of-application determining portion 205 determines that the number of times of application N* of the drive pulse voltage PM from the start of application of the drive pulse voltage PM having a pulse width T in step S108 exceeds the predetermined number Nth* (YES in step S110 in FIG. 3), the discharge probability calculating portion 202 calculates the discharge probability P* based on the number of times of application N* of the drive pulse voltage PM at this time and the number of times of discharge n* detected by the discharge determining portion 201 by Expression (31) (step S111 in FIG. 3).

$$P^*=n^*/N^* \quad (31)$$

A sensitivity parameter storing portion 19 stores, in advance as known sensitivity parameters of the optical sensor 1, a reference pulse width $T_0$ of the drive pulse voltage PM, and the difference $Q_1-Q_2$ between the received light quantities when the additional light source 101 is turned on and turned off. Either one of the above pulse widths $T_1$ and $T_2$ ($T_1 \neq T_2$) may be the same as the reference pulse width $T_0$.

It is assumed that a sensitivity parameter stored in the sensitivity parameter storing portion 19 is measured in advance, for example, in the shipping inspection of the light detection system.

After the measurement in a state in which the optical sensor 1 is shielded from light is ended, that is, the discharge probability P* is calculated, based on the discharge probabilities $_1$P* and $_2$P* calculated by the discharge probability calculating portion 202, the pulse widths $T_1$ and $T_2$ of the drive pulse voltage PM when the discharge probabilities $_1$P* and $_2$P* are obtained, and the parameter $T_0$ stored in the sensitivity parameter storing portion 19, the discharge probability calculating portion 203 calculates the discharge probability $P_{aB}$ of the irregular discharge by using Expression (22) (step S112 in FIG. 3). The discharge probability $P_{aB}$ is a probability of a discharge caused by a noise component other than a discharge occurring due to a photoelectric effect of the optical sensor 1 which occurs depending on the pulse width of the drive pulse voltage PM and occurs without depending on the received light quantity received by the optical sensor 1 as described above.

Subsequently, based on the discharge probabilities $_1$P*, $_2$P*, and P* calculated by the discharge probability calculating portion 202, the pulse widths $T_1$ and $T_2$ of the drive pulse voltage PM when the discharge probabilities $_1$P* and $_2$P* are obtained, and the pulse width T of the drive pulse voltage PM when the discharge probability P is obtained, the discharge probability calculating portion 203 calculates the discharge probability $P_{bB}$ of the irregular discharge by using Expression (23) (step S113 in FIG. 3). As described above, the discharge probability $P_{bB}$ is a probability of a discharge caused by a noise component other than the discharge occurring due to the photoelectric effect of the optical sensor 1 which occurs without depending on the pulse width of the drive pulse voltage PM and the received light quantity received by the optical sensor 1.

Next, the shutter control portion 23 outputs the shutter open signal when the calculation of the discharge probabilities $P_{aB}$ and $P_{bB}$ is ended.

The shutter drive portion 22 opens the shutter 21 when the shutter open signal is output from the shutter control portion 23 (step S114 in FIG. 3). When the shutter 21 is opened, a state in which the optical sensor 1 can receive light is achieved. The light from the light source 100 is incident on the optical sensor 1.

The discharge probability calculating portion 202 instructs the light source control portion 24 to turn on the additional light source 101 and then instructs the rectangular pulse generating portion 17 to start applying the drive pulse voltage PM.

In response to an instruction from the discharge probability calculating portion 202, the light source control portion 24 turns on the additional light source 101 (step S115 in FIG. 3). The received light quantity received by the optical sensor 1 at this time is $Q_1$. The additional light source 101 includes, for example, an LED.

In response to the instruction from the discharge probability calculating portion 202, the rectangular pulse generating portion 17 sets the pulse width of the rectangular pulse PS to a predetermined value T. By setting the pulse width, the application voltage generating circuit 12 applies the drive pulse voltage PM having the pulse width T between a pair of terminals 1a and 1b of the optical sensor 1 (step S116 in FIG. 3).

Same as above, the discharge determining portion 201 determines that the optical sensor 1 discharges when the detected voltage Vpv from the current detecting circuit 15 exceeds the threshold voltage Vth and increments the number of times of discharge $n_1$ by one (step S117 in FIG. 3). An initial value of the number of times of discharge $n_1$ and an initial value of the number of times of application $N_1$ of the drive pulse voltage PM are both 0. In this manner, the processes in steps S116 and S117 are repeatedly executed.

When the number-of-times-of-application determining portion 205 determines that the number of times of application $N_1$ of the drive pulse voltage PM from the start of application of the drive pulse voltage PM in step S116 exceeds the predetermined number Nth (YES in step S118 in FIG. 3), the discharge probability calculating portion 202 calculates the discharge probability $^1$P based on the number of times of application $N_1$ of the drive pulse voltage PM at this time and the number of times of discharge $n_1$ detected by the discharge determining portion 201 by Expression (32) (step S119 in FIG. 3).

$$^1P=n_1/N_1 \qquad (32)$$

After the discharge probability $^1$P is calculated, the discharge probability calculating portion 202 instructs the light source control portion 24 to turn off the additional light source 101 and then instructs the rectangular pulse generating portion 17 to start applying the drive pulse voltage PM again. In response to an instruction from the discharge probability calculating portion 202, the light source control portion 24 turns off the additional light source 101 (step S120 in FIG. 3). The received light quantity received by the optical sensor 1 at this time is $Q_2$.

In response to the instruction from the discharge probability calculating portion 202, the rectangular pulse generating portion 17 temporarily stops the output of the rectangular pulse PS, and then sets the pulse width of the rectangular pulse PS again to a predetermined value T. By setting the pulse width, the application voltage generating circuit 12 applies the drive pulse voltage PM having the pulse width T between a pair of terminals 1a and 1b of the optical sensor 1 (step S121 in FIG. 3).

Same as above, the discharge determining portion 201 determines that the optical sensor 1 discharges when the detected voltage Vpv from the current detecting circuit 15 exceeds the threshold voltage Vth and increments the number of times of discharge $n_2$ by one (step S122 in FIG. 3). An initial value of the number of times of discharge $n_2$ and an initial value of the number of times of application $N_2$ of the drive pulse voltage PM are both 0. In this manner, the processes in steps S121 and S122 are repeatedly executed.

When the number-of-times-of-application determining portion 205 determines that the number of times of application $N_2$ of the drive pulse voltage PM from the start of application of the drive pulse voltage PM in step S121 exceeds the predetermined number Nth (YES in step S123 in FIG. 3), the discharge probability calculating portion 202 calculates the discharge probability $^2$P based on the number of times of application $N_2$ of the drive pulse voltage PM at this time and the number of times of discharge $n_2$ detected by the discharge determining portion 201 by Expression (33) (step S124 in FIG. 3).

$$^2P=n_2/N_2 \qquad (33)$$

After the discharge probability $^2$P is calculated, the discharge probability calculating portion 202 instructs the rectangular pulse generating portion 17 to start applying the drive pulse voltage PM again.

In response to the instruction from the discharge probability calculating portion 202, the rectangular pulse generating portion 17 temporarily stops the output of the rectangular pulse PS, and then sets the pulse width of the rectangular pulse PS again to a predetermined value T. By setting the pulse width, the application voltage generating circuit 12 applies the drive pulse voltage PM having the pulse width T between a pair of terminals 1a and 1b of the optical sensor 1 (step S125 in FIG. 3).

Same as above, the discharge determining portion 201 determines that the optical sensor 1 discharges when the detected voltage Vpv from the current detecting circuit 15 exceeds the threshold voltage Vth and increments the number of times of discharge $n_3$ by one (step S126 in FIG. 3). An initial value of the number of times of discharge $n_3$ and an initial value of the number of times of application $N_3$ of the drive pulse voltage PM are both 0. In this manner, the processes in steps S125 and S126 are repeatedly executed.

When the number-of-times-of-application determining portion 205 determines that the number of times of application $N_3$ of the drive pulse voltage PM from the start of application of the drive pulse voltage PM in step S125 exceeds the predetermined number Nth (YES in step S127 in FIG. 3), the discharge probability calculating portion 202 calculates the discharge probability P based on the number of times of application $N_3$ of the drive pulse voltage PM at this time and the number of times of discharge $n_3$ detected by the discharge determining portion 201 by Expression (34) (step S128 in FIG. 3).

$$P = n_3/N_3 \tag{34}$$

After the discharge probability P is calculated, when the discharge probabilities $^1P$ and $^2P$ calculated by the discharge probability calculating portion 202 are greater than 0 and less than 1 (YES in step S129 in FIG. 4), based on the discharge probabilities $^1P$, $^2P$, and P calculated by the discharge probability calculating portion 202, the pulse width T of the drive pulse voltage PM when the discharge probabilities $^1P$, $^2P$ and P are obtained, the discharge probabilities $P_{aB}$ and $P_{bB}$ calculated by the discharge probability calculating portion 203, and the parameters $T_0$ and $Q_1$–$Q_2$ stored in the sensitivity parameter storing portion 19, the received light quantity calculating portion 206 calculates the received light quantity Q by using Expression (26) (step S130 in FIG. 4).

Further, when at least one of the discharge probabilities $^1P$ and $^2P$ calculated by the discharge probability calculating portion 202 is 0 (NO in step S129), the received light quantity calculating portion 206 performs the exception processing which sets the received light quantity Q to 0 or disables calculation of the received light quantity Q (step S131 in FIG. 4). Further, when at least one of the discharge probabilities $^1P$ and $^2P$ is 1 (NO in step S129), the received light quantity calculating portion 206 performs the exception processing which disables calculation of the received light quantity Q (step S131).

Next, the received light quantity determining portion 207 compares the received light quantity Q calculated by the received light quantity calculating portion 206 with a predetermined received light quantity threshold value Qth (step S132 in FIG. 4), and when the received light quantity Q exceeds the received light quantity threshold value Qth (YES in step S132), determines that a flame exists (step S133 in FIG. 4). Further, when the received light quantity Q is equal to or less than the received light quantity threshold value Qth (NO in Step S132), the received light quantity determining portion 207 determines that flame does not exist (Step S134 in FIG. 4).

As can be seen from the above description, in the present embodiment, it is possible to calculate the discharge probabilities $P_{aB}$ and $P_{bB}$ of the irregular discharges that occur without depending on the received light quantity received by the optical sensor 1. As it is considered that the discharge probabilities $P_{aB}$ and $P_{bB}$ are changed with the degradation of the optical sensor 1, it is possible to implement a life determination of the optical sensor 1 based on the discharge probabilities $P_{aB}$ and $P_{bB}$.

Further, in the present embodiment, even when at least one of the discharge probabilities $P_{aA}$ and $P_{bB}$, is an unknown number, the received light quantity Q can be calculated, and it is thereby possible to accurately detect the presence or absence of a flame by using the obtained received light quantity Q. Further, in the present embodiment, it is possible to reduce the possibility that the life of the optical sensor 1 is erroneously determined by using the received light quantity Q.

In the present embodiment, $T \ne T_1 \ne T_2$ may be set, or $T=T_1 \ne T_2$ or $T=T_2 \ne T_1$ may be set. When $T=T_1$, the processes illustrated in FIG. 5 can be performed instead of the processes illustrated in FIG. 3. The processes of steps S100 to S107 in FIG. 5 are as described with reference to FIG. 3.

Figure 5:
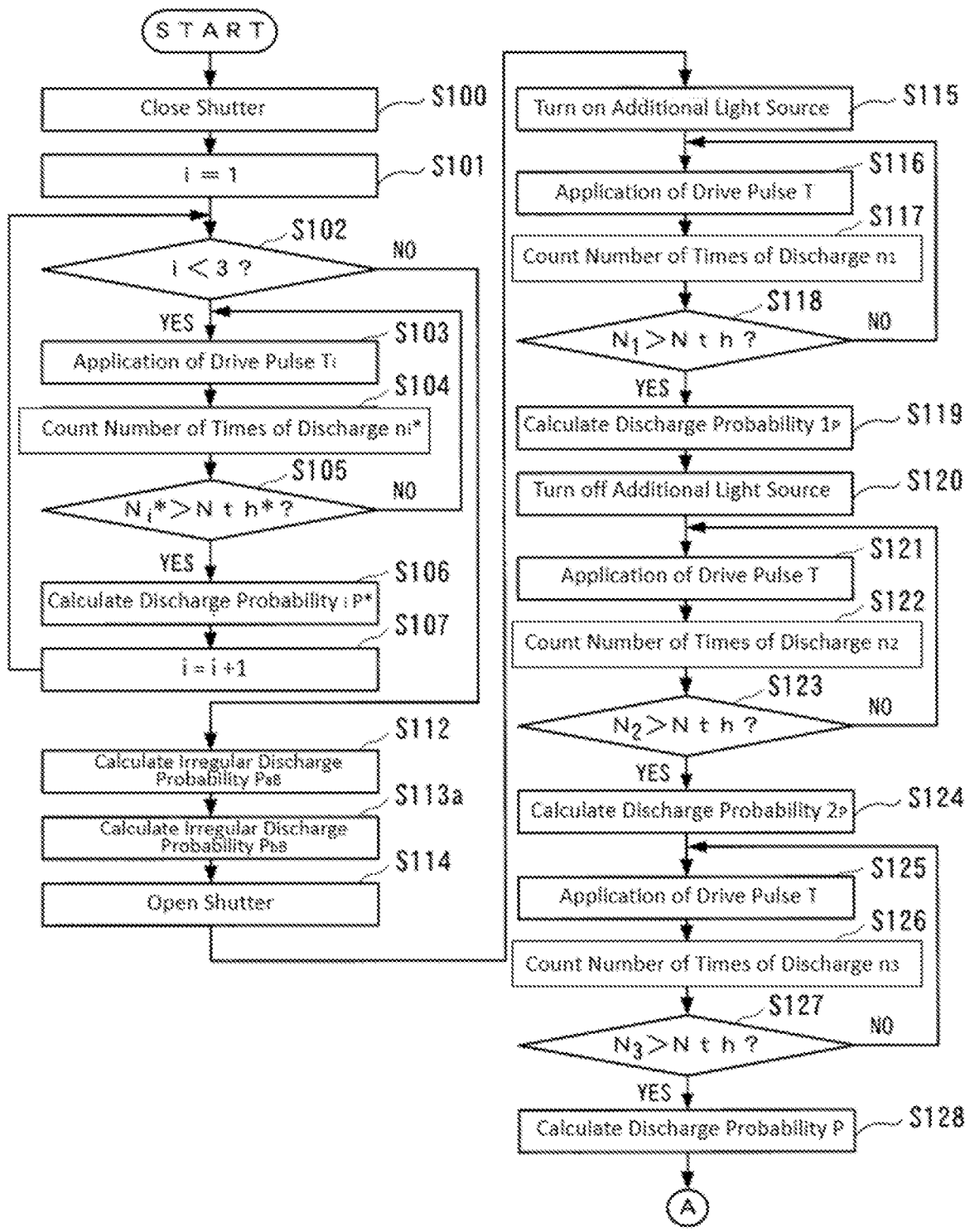
FIG. 5 is a flowchart explaining another operation of the light detection system according to the embodiment of the present disclosure.

When the variable i reaches 3 (NO in step S102), the discharge probability calculating portion 203 calculates the discharge probability $P_{aB}$ of the irregular discharge by using Expression (22) (step S112 in FIG. 5).

Further, based on the discharge probabilities $_1P^*$ and $_2P^*$ calculated by the discharge probability calculating portion 202 and the pulse widths $T_1$ and $T_2$ of the drive pulse voltage PM when the discharge probabilities $_1P^*$ and $_2P^*$ are obtained, the discharge probability calculating portion 203 calculates the discharge probability $P_{bB}$ of the irregular discharge by using Expression (24) (step S113a in FIG. 5). The processes of steps S114 to S128 are as described with reference to FIG. 3. Further, since the processes after step S129 are as described with reference to FIG. 4, the illustration is omitted.

The case of $T=T_2$ is the same as the case of $T=T_1$. When $T=T_2$, the discharge probability calculating portion 203 may calculate the discharge probability $P_{bB}$ by using Expression (25) in step S113a in FIG. 5. Other processes are the same as in the case of $T=T_1$.

Figure 6:
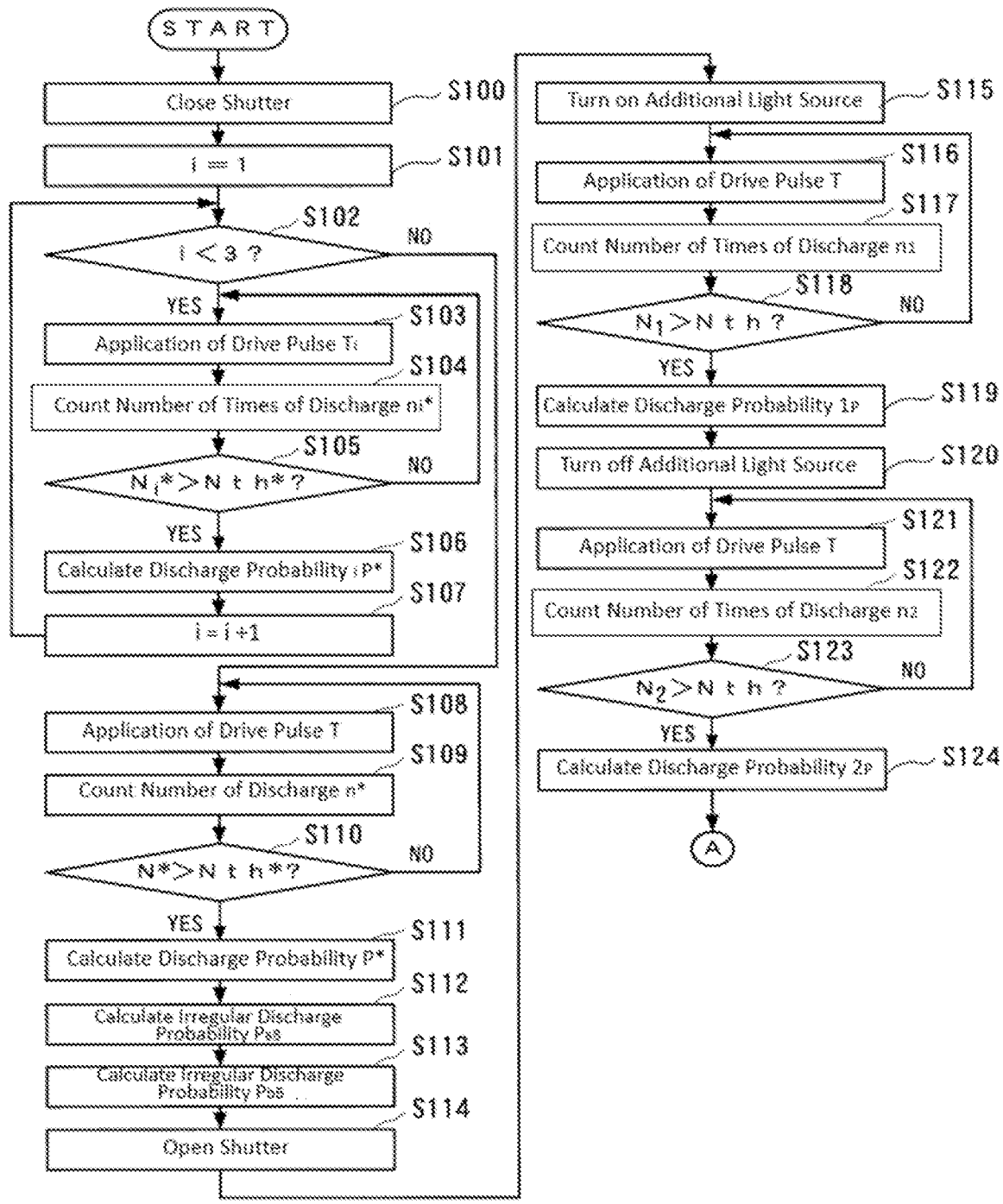
FIG. 6 is a flowchart explaining another operation of the light detection system according to the embodiment of the present disclosure.
Figure 7:
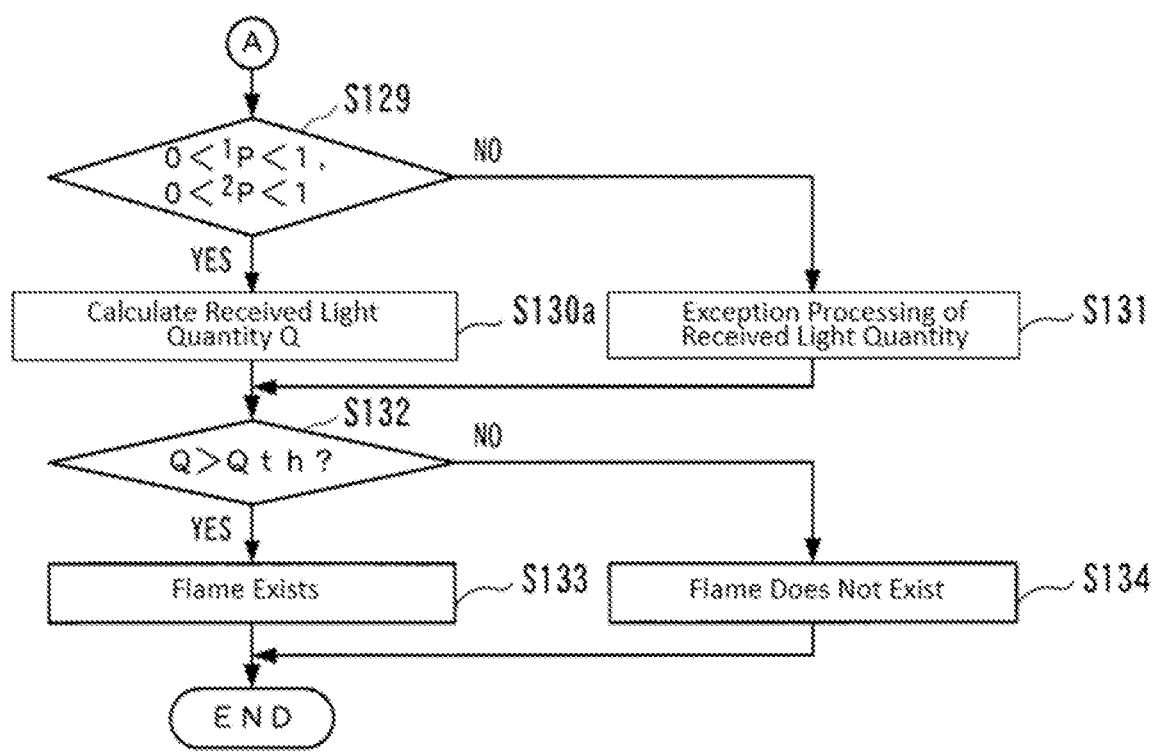
FIG. 7 is a flowchart explaining another operation of the light detection system according to the embodiment of the present disclosure.

Further, as described above, when the received light quantity when there is only the light source 100 in a state in which the additional light source 101 is turned off, is $Q_2$, instead of the processes illustrated in FIGS. 3 and 4, the processes illustrated in FIGS. 6 and 7 can be performed. The processes of steps S100 to S124 in FIG. 6 are as described with reference to FIG. 3.

After the discharge probability $^2P$ is calculated, when the discharge probabilities $^1P$ and $^2P$ calculated by the discharge probability calculating portion 202 are greater than 0 and less than 1 (YES in step S129 in FIG. 7), based on the discharge probabilities $^1P$ and $^2P$ calculated by the discharge probability calculating portion 202, the pulse width T of the drive pulse voltage PM when the discharge probabilities $^1P$ and $^2P$ are obtained, the discharge probabilities $P_{aB}$ and $P_{bB}$ calculated by the discharge probability calculating portion 203, and the parameters $T_0$ and $Q_1$–$Q_2$ stored in the sensitivity parameter storing portion 19, the received light quantity calculating portion 206 calculates the received light quantity Q by using Expression (27) (step S130a in FIG. 7). The processes of steps S131 to S134 in FIG. 7 are as described with reference to FIG. 4.

Further, the example in FIG. 5 and the example in FIG. 6 may be combined, the processes of steps S108 to S111 may be omitted in FIG. 6, and the processes of step S113a may be performed instead of step S113.

In the example in FIG. 3, a state in which the shutter is closed (a state in which the optical sensor 1 is shielded from light) is defined as a first state (when the pulse width is $T_1$ in steps S103 to S105), a second state (when the pulse width is $T_2$ in steps S103 to S105), and a third state (steps S108 to S110), a state in which the additional light source 101 is turned on while it is in a state in which the shutter is opened (a state in which optical sensor 1 can receive light) is defined as a fourth state (steps S116 to S118), and a state in which the additional light source 101 is turned off while it is in the state in which the shutter is opened is defined as a fifth state (steps S121 to S123) and a sixth state (steps S125 to S127).

Further, in the example in FIG. 5, the state in which the shutter is closed is defined as a first state (when the pulse width is $T_1$ in steps S103 to S105) and a second state (when the pulse width is $T_2$ in steps S103 to S105), the state in which the additional light source 101 is turned on while it is in the state in which the shutter is opened is defined as a third state (steps S116 to S118), and the state in which the additional light source 101 is turned off while it is in the state in which the shutter is opened is defined as a fourth state (steps S121 to S123) and a fifth state (steps S125 to S127).

Further, in the example in FIG. 6, the state in which the shutter is closed is defined as a first state (when the pulse width is $T_1$ in steps S103 to S105), a second state (when the pulse width is $T_2$ in steps S103 to S105), and a third state (steps S108 to S110), the state in which the additional light source 101 is turned on while it is in the state in which the shutter is opened is defined as a fourth state (steps S116 to S118), and the state in which the additional light source 101 is turned off while it is in the state in which the shutter is opened is defined as a fifth state (steps S121 to S123).

In these examples in FIGS. 3, 5, and 6, $Q_1-Q_2$ is defined as a positive value ($Q_1>Q_2$), but $Q_1-Q_2$ may be a negative value ($Q_1<Q_2$).

Specifically, the discharge probability calculating portion 202 may turn off the additional light source 101 in step S115 in FIGS. 3, 5, and 6, and turn on the additional light source 101 in step S120 in FIGS. 3, 5, and 6. However, when the additional light source 101 is turned on in step S120 in FIGS. 3, 5, and 6, when the calculation of the discharge probability $^2P$ is ended, the discharge probability calculating portion 202 needs to instruct the light source control portion 24 to turn off the additional light source 101.

As a result, in the example in FIG. 3, the state in which the shutter is closed is defined as a first state (when the pulse width is $T_1$ in steps S103 to S105), a second state (when the pulse width is $T_2$ in steps S103 to S105), and a third state (steps S108 to S110), the state in which the additional light source 101 is turned off while it is in the state in which the shutter is opened is defined as a fourth state (steps S116 to S118), the state in which the additional light source 101 is turned on while it is in the state in which the shutter is opened is defined as a fifth state (steps S121 to S123), and the state in which the additional light source 101 is turned off while it is in the state in which the shutter is opened is defined as a sixth state (steps S125 to S127).

Further, in the example in FIG. 5, the state in which the shutter is closed is defined as a first state (when the pulse width is $T_1$ in steps S103 to S105) and a second state (when the pulse width is $T_2$ in steps S103 to S105), the state in which the additional light source 101 is turned off while it is in the state in which the shutter is opened is defined as a third state (steps S116 to S118), the state in which the additional light source 101 is turned on while it is in the state in which the shutter is opened is defined as a fourth state (steps S121 to S123), and the state in which the additional light source 101 is turned off while it is in the state in which the shutter is opened is defined as a fifth state (steps S125 to S127).

Further, in the example in FIG. 6, the state in which the shutter is closed is defined as a first state (when the pulse width is $T_1$ in steps S103 to S105), a second state (when the pulse width is $T_2$ in steps S103 to S105), and a third state (steps S108 to S110), the state in which the additional light source 101 is turned off while it is in the state in which the shutter is opened is defined as a fourth state (steps S116 to S118), and the state in which the additional light source 101 is turned on while it is in the state in which the shutter is opened is defined as a fifth state (steps S121 to S123).

Further, when the additional light source 101 is turned off in step S115 in FIG. 6, and the additional light source 101 is turned on in step S120 in FIG. 6, the received light quantity when there is only the light source 100 in the state in which the additional light source 101 is turned off, becomes $Q_1$. In this case, the received light quantity calculating portion 206 may calculate the received light quantity Q by using Expression (28) (step S130a in FIG. 7).

In the present embodiment, when only the discharge probabilities $P_{aB}$ and $P_{bB}$ are calculated, the processing of the received light quantity calculating portion 206, the received light quantity determining portion 207, and step S114 and subsequent steps are unnecessary.

In the present embodiment, although the present disclosure is applied to the light detection system having a shutter mechanism, the present disclosure can also be applied to a light detection system without a shutter mechanism. In this case, when the processing in steps S101 to S113 in FIGS. 3 and 6, or steps S101 to S107, S112, and S113a in FIG. 5, is performed at the time of shipping inspection of the light detection system or on site where the light detection system is installed, the optical sensor 1 may be shielded from light by attaching a cover to the optical sensor 1, for example. At this time, a signal indicating that the optical sensor 1 is shielded from light is input to the light detection system, for example, by a user's operation. Accordingly, the calculating device 3 of the light detection system performs the processing of steps S101 to S113 in FIGS. 3 and 6, or steps S101 to S107, S112, and S113a in FIG. 5.

Further, when the processing of steps S115 to S128 in FIGS. 3 and 5, or steps S115 to S124 in FIG. 6, is performed, the state in which the optical sensor 1 is shielded from light may be released to achieve a state in which the optical sensor 1 can receive light. At this time, a signal indicating the state in which the optical sensor 1 can receive light is input to the light detection system, for example, by a user's operation. Accordingly, the calculating device 3 of the light detection system performs the processing of steps S115 to S128 in FIGS. 3 and 5, or steps S115 to S124 in FIG. 6.

In the present embodiment, the case where the light source 100 is a flame is described as an example, but the light detection system of the present disclosure can be applied to the light source 100 other than a flame.

The sensitivity parameter storing portion 19 and the central processing portion 20 described in the present embodiment can be implemented by a computer including a central processing unit (CPU), a storage device, and an interface, and a program configured to control these hardware resources.

Figure 8:
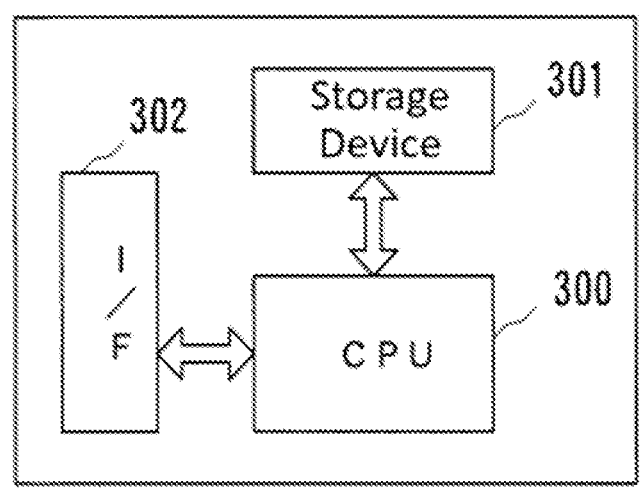
FIG. 8 is a block diagram illustrating a configuration example of a computer that implements the light detection system according to the embodiment of the present disclosure.

A configuration example of the computer is illustrated in FIG. 8. The computer includes a CPU 300, a storage device 301, and an interface device (I/F) 302. To the I/F 302, the application voltage generating circuit 12, the rectangular pulse generating portion 17, the A/D converting portion 18, the shutter control portion 23, the light source control portion 24, and the like are connected. In the computer described above, a program for causing the computer to achieve a discharge probability calculating method and a received light quantity measuring method according to the present disclosure is stored in the storage device 301. The CPU 300 executes the processes described in the present embodiment in accordance with the program stored in the storage device 301.

INDUSTRIAL APPLICABILITY

The present disclosure can be applied to a flame detection system. Further, the present disclosure can also be applied to detection of light other than a flame.

DESCRIPTION OF REFERENCE NUMERALS AND SIGNS

1: optical sensor, 2: external power supply, 3: calculating device, 11: power supply circuit, 12: application voltage generating circuit, 13: trigger circuit, 14: voltage dividing resistor, 15: current detecting circuit, 16: processing circuit, 17: rectangular pulse generating portion, 18: A/D converting portion, 19: sensitivity parameter storing portion, 20: central processing portion, 21: shutter, 22: shutter drive portion, 23: shutter control portion, 24: light source control portion, 100: light source, 101: additional light source, 201: discharge determining portion, 202, 203: discharge probability calculating portion, 204: number-of-times-of-pulse-application accumulating portion, 205: number-of-times-of-application determining portion, 206: received light quantity calculating portion, 207: received light quantity determining portion

The invention claimed is:

1. A light detection system comprising:
an optical sensor configured to detect light emitted from a first light source;
an application voltage generating portion configured to periodically apply a drive pulse voltage to an electrode of the optical sensor;
a current detecting portion configured to detect a discharge current of the optical sensor;
a discharge determining portion configured to detect a discharge of the optical sensor based on the discharge current detected by the current detecting portion;
a first discharge probability calculating portion configured to calculate a discharge probability based on the number of times of application of the drive pulse voltage applied by the application voltage generating portion and the number of times of discharge detected by the discharge determining portion during the application of the drive pulse voltage for each of a first state in which the optical sensor is shielded from the light, and a second state in which the optical sensor is shielded from the light and a pulse width of the drive pulse voltage is different from that of the first state;
a storing portion configured to store, in advance as a known sensitivity parameter of the optical sensor, a reference pulse width of the drive pulse voltage; and
a second discharge probability calculating portion configured to calculate a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated by the first discharge probability calculating portion in the first and second states, and the pulse widths of the drive pulse voltage in the first and second states.

2. A light detection system comprising:
an optical sensor configured to detect light emitted from a first light source;
an application voltage generating portion configured to periodically apply a drive pulse voltage to an electrode of the optical sensor;
a current detecting portion configured to detect a discharge current of the optical sensor;
a discharge determining portion configured to detect a discharge of the optical sensor based on the discharge current detected by the current detecting portion;
a first discharge probability calculating portion configured to calculate a discharge probability based on the number of times of application of the drive pulse voltage applied by the application voltage generating portion and the number of times of discharge detected by the discharge determining portion during the application of the drive pulse voltage for each of a first state in which the optical sensor is shielded from the light, a second state in which the optical sensor is shielded from the light and a pulse width of the drive pulse voltage is different from that of the first state, and a third state in which the optical sensor is shielded from the light and a pulse width of the drive pulse voltage is the same as that of either the first or second state or different from those of the first and second states;
a storing portion configured to store, in advance as a known sensitivity parameter of the optical sensor, a reference pulse width of the drive pulse voltage; and
a second discharge probability calculating portion configured to calculate a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated by the first discharge probability calculating portion in the first, second, and third states, and the pulse widths of the drive pulse voltage in the first, second, and third states.

3. The light detection system according to claim 1, further comprising:
a second light source having a known light quantity, which is installed such that generated light is incident on the optical sensor together with the light from the first light source;
a light source control portion configured to control turning-on/turning-off of the second light source; and
a received light quantity calculating portion configured to calculate the received light quantity of the optical sensor;
wherein
the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, a third state in which the second light source is turned on or turned off, and a fourth state in which a turning-on/turning-off state of the second light source is different from that of the third state and a pulse width of the drive pulse voltage is the same as that of the third state, the storing portion is configured to store, in advance as known sensitivity parameters of the optical sensor, a difference in received light quantity received by the optical sensor between the third state and the fourth state in addition to the reference pulse width of the drive pulse voltage, and the received light quantity calculating portion is configured to calculate the received light quantities received by the optical sensor in the third and fourth states based on the sensitivity parameters stored in the storing portion, the discharge probabilities calculated by the first discharge probability calculating portion in the third and fourth states, the pulse widths of the drive pulse voltage in the third and fourth states, and the discharge probabilities calculated by the second discharge probability calculating portion.

4. The light detection system according to claim 1, further comprising:
a second light source having a known light quantity, which is installed such that generated light is incident on the optical sensor together with the light from the first light source;
a light source control portion configured to control turning-on/turning-off of the second light source; and
a received light quantity calculating portion configured to calculate the received light quantity of the optical sensor;

wherein
the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, a third state in which the second light source is turned on or turned off, a fourth state in which a turning-on/turning-off state of the second light source is different from that of the third state and a pulse width of the drive pulse voltage is the same as that of the third state, and a fifth state in which the second light source is turned off and a pulse width of the drive pulse voltage is the same as that of the third and fourth states, the storing portion is configured to store, in advance as known sensitivity parameters of the optical sensor, a difference in received light quantity received by the optical sensor between the third state and the fourth state in addition to the reference pulse width of the drive pulse voltage, and the received light quantity calculating portion is configured to calculate received light quantities received by the optical sensor in the third, fourth, and fifth states based on the sensitivity parameters stored in the storing portion, the discharge probabilities calculated by the first discharge probability calculating portion in the third, fourth, and fifth states, the pulse widths of the drive pulse voltage in the third, fourth, and fifth states, and the discharge probabilities calculated by the second discharge probability calculating portion.

5. The light detection system according to claim 2, further comprising:
a second light source having a known light quantity, which is installed such that generated light is incident on the optical sensor together with the light from the first light source;
a light source control portion configured to control turning-on/turning-off of the second light source; and
a received light quantity calculating portion configured to calculate the received light quantity of the optical sensor;

wherein
the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, the third state, a fourth state in which the second light source is turned on or turned off, and a fifth state in which a turning-on/turning-off state of the second light source is different from that of the fourth state and a pulse width of the drive pulse voltage is the same as that of the fourth state, the storing portion is configured to store, in advance as known sensitivity parameters of the optical sensor, a difference in received light quantity received by the optical sensor between the fourth state and the fifth state in addition to the reference pulse width of the drive pulse voltage, and the received light quantity calculating portion is configured to calculate the received light quantities received by the optical sensor in the fourth and fifth states based on the sensitivity parameters stored in the storing portion, the discharge probabilities calculated by the first discharge probability calculating portion in the fourth and fifth states, the pulse widths of the drive pulse voltage in the fourth and fifth states, and the discharge probabilities calculated by the second discharge probability calculating portion.

6. The light detection system according to claim 2, further comprising:
a second light source having a known light quantity, which is installed such that generated light is incident on the optical sensor together with the light from the first light source;
a light source control portion configured to control turning-on/turning-off of the second light source; and
a received light quantity calculating portion configured to calculate the received light quantity of the optical sensor;

wherein
the first discharge probability calculating portion is configured to calculate a discharge probability based on the number of times of application of the drive pulse voltage applied by the application voltage generating portion and the number of times of discharge detected by the discharge determining portion during the application of the drive pulse voltage for each of the first state, the second state, the third state, a fourth state in which the second light source is turned on or turned off, a fifth state in which a turning-on/turning-off state of the second light source is different from that of the fourth state and a pulse width of the drive pulse voltage is the same as that of the fourth state, and a sixth state in which the second light source is turned off and a pulse width of the drive pulse voltage is the same as that of the fourth and fifth states, the storing portion is configured to store, in advance as known sensitivity parameters of the optical sensor, a difference in received light quantity received by the optical sensor between the fourth state and the fifth state in addition to the reference pulse width of the drive pulse voltage, and the received light quantity calculating portion is configured to calculate received light quantities received by the optical sensor in the fourth, fifth, and sixth states based on the sensitivity parameters stored in the storing portion, the discharge probabilities calculated by the first discharge probability calculating portion in the fourth, fifth, and sixth states, the pulse widths of the drive pulse voltage in the fourth, fifth, and sixth states, and the discharge probabilities calculated by the second discharge probability calculating portion.

7. The light detection system according to claim 1, wherein
the second discharge probability calculating portion is configured to calculate a discharge probability $P_{aB}$ of the first type irregular discharge by using $$P_{aB} = 1 - \left(\frac{1 - {}_1P^*}{1 - {}_2P^*}\right)^{\frac{T_0}{T_1 - T_2}}$$

and calculate a discharge probability $P_{bB}$ of the second type irregular discharge by using $$P_{bB} = 1 - \left(\frac{1 - {}_2P^*}{1 - {}_1P^*}\right)^{\frac{T}{T_1 - T_2}} \cdot (1 - {}_1P^*) \text{ or}$$

$$P_{bB} = 1 - \left(\frac{1 - {}_2P^*}{1 - {}_1P^*}\right)^{\frac{T_2}{T_1 - T_2}} \cdot (1 - {}_2P^*)$$

where $T_0$ is the reference pulse width of the drive pulse voltage, ${}_1P^*$ is the discharge probability calculated by the first discharge probability calculating portion in the first state, ${}_2P^*$ is the discharge probability calculated by the first discharge probability calculating portion in the second state, $T_1$ is the pulse width of the drive pulse voltage in the first state, $T_2$ ($T_1 \neq T_2$) is the pulse width of the drive pulse voltage in the second state, $P_{aB}$ is the discharge probability of the first type irregular discharge, and $P_{bB}$ is the discharge probability of the second type irregular discharge.

8. The light detection system according to claim 2, wherein
the second discharge probability calculating portion is configured to calculate a discharge probability $P_{aB}$ of the first type irregular discharge by using $$P_{aB} = 1 - \left(\frac{1 - {}_1P^*}{1 - {}_2P^*}\right)^{\frac{T_0}{T_1 - T_2}}$$

and calculate a discharge probability $P_{bB}$ of the second type irregular discharge by using $$P_{bB} = 1 - \left(\frac{1 - {}_2P^*}{1 - {}_1P^*}\right)^{\frac{T}{T_1 - T_2}} \cdot (1 - P^*)$$

where $T_0$ is the reference pulse width of the drive pulse voltage, ${}_1P^*$ is the discharge probability calculated by the first discharge probability calculating portion in the first state, ${}_2P^*$ is the discharge probability calculated by the first discharge probability calculating portion in the second state, $P^*$ is the discharge probability calculated by the first discharge probability calculating portion in the third state, $T_1$ is the pulse width of the drive pulse voltage in the first state, $T_2$ is the pulse width of the drive pulse voltage in the second state, $T$ ($T \neq T_1 \neq T_2$ or $T = T_1 \neq T_2$ or $T = T_2 \neq T_1$) is the pulse width of the drive pulse voltage in the third state, $P_{aB}$ is the discharge probability of the first type irregular discharge, and $P_{bB}$ is the discharge probability of the second type irregular discharge.

9. The light detection system according to claim 3, wherein
the received light quantity calculating portion is configured to calculate the received light quantity Q by using $$Q = (Q_1 - Q_2) \cdot \log_{\frac{1 - {}^1P}{1 - {}^2P}} \frac{1 - {}^2P}{(1 - P_{aB})^{\frac{T}{T_0}} \cdot (1 - P_{bB})} \text{ or}$$

$$Q = (Q_1 - Q_2) \cdot \log_{\frac{1 - {}^1P}{1 - {}^2P}} \frac{1 - {}^1P}{(1 - P_{aB})^{\frac{T}{T_0}} \cdot (1 - P_{bB})}$$

where $T_0$ is the reference pulse width of the drive pulse voltage, $Q_1 - Q_2$ is the difference in received light quantity received by the optical sensor between the third state and the fourth state, $P_{aB}$ is the discharge probability of the first type irregular discharge, $P_{bB}$ is the discharge probability of the second type irregular discharge, ${}^1P$ is the discharge probability calculated by the first discharge probability calculating portion in the third state, ${}^2P$ is the discharge probability calculated by the first discharge probability calculating portion in the fourth state, T is the pulse width of the drive pulse voltage in the third and fourth states, and Q is the received light quantity received by the optical sensor in the third and fourth states.

10. The light detection system according to claim 4, wherein
the received light quantity calculating portion is configured to calculate the received light quantity Q by using $$Q = (Q_1 - Q_2) \cdot \log_{\frac{1 - {}^1P}{1 - {}^2P}} \frac{1 - P}{(1 - P_{aB})^{\frac{T}{T_0}} \cdot (1 - P_{bB})}$$

where $T_0$ is the reference pulse width of the drive pulse voltage, $Q_1 - Q_2$ is the difference in received light quantity received by the optical sensor between the third and fourth states, $P_{aB}$ is the discharge probability of the first type irregular discharge, $P_{bB}$ is the discharge probability of the second type irregular discharge, ${}^1P$ is the discharge probability calculated by the first discharge probability calculating portion in the third state, ${}^2P$ is the discharge probability calculated by the first discharge probability calculating portion in the fourth state, P is the discharge probability calculated by the first discharge probability calculating portion in the fifth state, T is the pulse width of the drive pulse voltage in the third, fourth, and fifth states, and Q is the received light quantity received by the optical sensor in the third, fourth, and fifth states.

11. The light detection system according to claim 5, wherein
the received light quantity calculating portion is configured to calculate the received light quantity Q by using $$Q = (Q_1 - Q_2) \cdot \log_{\frac{1-{}^1P}{1-{}^2P}} \frac{1-{}^2P}{(1-P_{aB})^{\frac{T}{T_0}} \cdot (1-P_{bB})} \text{ or}$$

$$Q = (Q_1 - Q_2) \cdot \log_{\frac{1-{}^1P}{1-{}^2P}} \frac{1-{}^1P}{(1-P_{aB})^{\frac{T}{T_0}} \cdot (1-P_{bB})}$$

where $T_0$ is the reference pulse width of the drive pulse voltage, $Q_1-Q_2$ is the difference in received light quantity received by the optical sensor between the fourth and fifth states, $P_{aB}$ is the discharge probability of the first type irregular discharge, $P_{bB}$ is the discharge probability of the second type irregular discharge, $^1P$ is the discharge probability calculated by the first discharge probability calculating portion in the fourth state, $^2P$ is the discharge probability calculated by the first discharge probability calculating portion in the fifth state, T is the pulse width of the drive pulse voltage in the fourth and fifth states, and Q is the received light quantity received by the optical sensor in the fourth and fifth states.

12. The light detection system according to claim 6, wherein
the received light quantity calculating portion is configured to calculate the received light quantity Q by using $$Q = (Q_1 - Q_2) \cdot \log_{\frac{1-{}^1P}{1-{}^2P}} \frac{1-P}{(1-P_{aB})^{\frac{T}{T_0}} \cdot (1-P_{bB})}$$

where $T_0$ is the reference pulse width of the drive pulse voltage, $Q_1-Q_2$ is the difference in received light quantity received by the optical sensor between the fourth and fifth states, $P_{aB}$ is the discharge probability of the first type irregular discharge, $P_{bB}$ is the discharge probability of the second type irregular discharge, $^1P$ is the discharge probability calculated by the first discharge probability calculating portion in the fourth state, $^2P$ is the discharge probability calculated by the first discharge probability calculating portion in the fifth state, P is the discharge probability calculated by the first discharge probability calculating portion in the sixth state, T is the pulse width of the drive pulse voltage in the fourth, fifth, and sixth states, and Q is the received light quantity received by the optical sensor in the fourth, fifth, and sixth states.

13. A discharge probability calculating method of a light detection system, the method comprising:
a first step of periodically applying a drive pulse voltage to an electrode of an optical sensor that detects light emitted from a light source in a first state in which the optical sensor is shielded from the light;
a second step of detecting a discharge current of the optical sensor in the first state;
a third step of detecting a discharge of the optical sensor based on the discharge current in the first state;
a fourth step of calculating a discharge probability in the first state based on the number of times of application of the drive pulse voltage applied in the first step and the number of times of discharge detected in the third step during the application of the drive pulse voltage;
a fifth step of periodically applying the drive pulse voltage to the electrode of the optical sensor in a second state in which the optical sensor is shielded from the light and a pulse width of the drive pulse voltage is different from that of the first state;
a sixth step of detecting a discharge current of the optical sensor in the second state;
a seventh step of detecting a discharge of the optical sensor based on the discharge current in the second state;
an eighth step of calculating a discharge probability in the second state based on the number of times of application of the drive pulse voltage applied in the fifth step and the number of times of discharge detected in the seventh step during the application of the drive pulse voltage; and
a ninth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth and eighth steps, and the pulse widths of the drive pulse voltage in the first and second states.

14. A discharge probability calculating method of a light detection system, the method comprising:
a first step of periodically applying a drive pulse voltage to an electrode of an optical sensor that detects light emitted from a light source in a first state in which the optical sensor is shielded from the light;
a second step of detecting a discharge current of the optical sensor in the first state;
a third step of detecting a discharge of the optical sensor based on the discharge current in the first state;
a fourth step of calculating a discharge probability in the first state based on the number of times of application of the drive pulse voltage applied in the first step and the number of times of discharge detected in the third step during the application of the drive pulse voltage;
a fifth step of periodically applying the drive pulse voltage to the electrode of the optical sensor in a second state in which the optical sensor is shielded from the light and a pulse width of the drive pulse voltage is different from that of the first state;
a sixth step of detecting a discharge current of the optical sensor in the second state;
a seventh step of detecting a discharge of the optical sensor based on the discharge current in the second state;
an eighth step of calculating a discharge probability in the second state based on the number of times of application of the drive pulse voltage applied in the fifth step and the number of times of discharge detected in the seventh step during the application of the drive pulse voltage;

a ninth step of periodically applying the drive pulse voltage to the electrode of the optical sensor in a third state in which the optical sensor is shielded from the light and a pulse width of the drive pulse voltage is the same as that of either the first or second state or different from those of the first and second states;

a tenth step of detecting a discharge current of the optical sensor in the third state;

an eleventh step of detecting a discharge of the optical sensor based on the discharge current in the third state;

a twelfth step of calculating a discharge probability in the third state based on the number of times of application of the drive pulse voltage applied in the ninth step and the number of times of discharge detected in the eleventh step during the application of the drive pulse voltage; and a thirteenth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth, eighth, and twelfth steps, and the pulse widths of the drive pulse voltage in the first, second, and third states.

15. A received light quantity measuring method of a light detection system, the method comprising:

a first step of periodically applying a drive pulse voltage to an electrode of an optical sensor that detects light emitted from a first light source in a first state in which the optical sensor is shielded from the light;

a second step of detecting a discharge current of the optical sensor in the first state;

a third step of detecting a discharge of the optical sensor based on the discharge current in the first state;

a fourth step of calculating a discharge probability in the first state based on the number of times of application of the drive pulse voltage applied in the first step and the number of times of discharge detected in the third step during the application of the drive pulse voltage;

a fifth step of periodically applying the drive pulse voltage to the electrode of the optical sensor in a second state in which the optical sensor is shielded from the light and a pulse width of the drive pulse voltage is different from that of the first state;

a sixth step of detecting a discharge current of the optical sensor in the second state;

a seventh step of detecting a discharge of the optical sensor based on the discharge current in the second state;

an eighth step of calculating a discharge probability in the second state based on the number of times of application of the drive pulse voltage applied in the fifth step and the number of times of discharge detected in the seventh step during the application of the drive pulse voltage;

a ninth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth and eighth steps, and the pulse widths of the drive pulse voltage in the first and second states;

a tenth step of periodically applying the drive pulse voltage to the electrode of the optical sensor in a third state in which light from a second light source having a known light quantity is incident on the optical sensor or the second light source is turned off;

an eleventh step of detecting a discharge current of the optical sensor in the third state;

a twelfth step of detecting a discharge of the optical sensor based on the discharge current in the third state;

a thirteenth step of calculating a discharge probability in the third state based on the number of times of application of the drive pulse voltage applied in the tenth step and the number of times of discharge detected in the twelfth step during the application of the drive pulse voltage;

a fourteenth step of periodically applying the drive pulse voltage to the electrode of the optical sensor in a fourth state in which a turning-on/turning-off state of the second light source is different from that of the third state and a pulse width of the drive pulse voltage is the same as that of the third state;

a fifteenth step of detecting a discharge current of the optical sensor in the fourth state;

a sixteenth step of detecting a discharge of the optical sensor based on the discharge current in the fourth state;

a seventeenth step of calculating a discharge probability in the fourth state based on the number of times of application of the drive pulse voltage applied in the fourteenth step and the number of times of discharge detected in the sixteenth step during the application of the drive pulse voltage; and an eighteenth step of referring to the storing portion that stores, in advance as known sensitivity parameters of the optical sensor, a difference in received light quantity received by the optical sensor between the third state and the fourth state in addition to the reference pulse width of the drive pulse voltage, and calculating the received light quantities received by the optical sensor in the third and fourth states, based on the sensitivity parameters stored in the storing portion, the discharge probabilities calculated in the thirteenth and seventeenth steps, the pulse widths of the drive pulse voltage in the third and fourth states, and the discharge probabilities calculated in the ninth step.

16. A received light quantity measuring method of a light detection system, the method comprising:
- a first step of periodically applying a drive pulse voltage to an electrode of an optical sensor that detects light emitted from a first light source in a first state in which the optical sensor is shielded from the light;
- a second step of detecting a discharge current of the optical sensor in the first state;
- a third step of detecting a discharge of the optical sensor based on the discharge current in the first state;
- a fourth step of calculating a discharge probability in the first state based on the number of times of application of the drive pulse voltage applied in the first step and the number of times of discharge detected in the third step during the application of the drive pulse voltage;
- a fifth step of periodically applying the drive pulse voltage to the electrode of the optical sensor in a second state in which the optical sensor is shielded from the light and a pulse width of the drive pulse voltage is different from that of the first state;
- a sixth step of detecting a discharge current of the optical sensor in the second state;
- a seventh step of detecting a discharge of the optical sensor based on the discharge current in the second state;
- an eighth step of calculating a discharge probability in the second state based on the number of times of application of the drive pulse voltage applied in the fifth step and the number of times of discharge detected in the seventh step during the application of the drive pulse voltage;
- a ninth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth and eighth steps, and the pulse widths of the drive pulse voltage in the first and second states;
- a tenth step of periodically applying the drive pulse voltage to the electrode of the optical sensor in a third state in which light from a second light source having a known light quantity is incident on the optical sensor or the second light source is turned off;
- an eleventh step of detecting a discharge current of the optical sensor in the third state;
- a twelfth step of detecting a discharge of the optical sensor based on the discharge current in the third state;
- a thirteenth step of calculating a discharge probability in the third state based on the number of times of application of the drive pulse voltage applied in the tenth step and the number of times of discharge detected in the twelfth step during the application of the drive pulse voltage;
- a fourteenth step of periodically applying the drive pulse voltage to the electrode of the optical sensor in a fourth state in which a turning-on/turning-off state of the second light source is different from that of the third state and a pulse width of the drive pulse voltage is the same as that of the third state;
- a fifteenth step of detecting a discharge current of the optical sensor in the fourth state;
- a sixteenth step of detecting a discharge of the optical sensor based on the discharge current in the fourth state;
- a seventeenth step of calculating a discharge probability in the fourth state based on the number of times of application of the drive pulse voltage applied in the fourteenth step and the number of times of discharge detected in the sixteenth step during the application of the drive pulse voltage;
- an eighteenth step of periodically applying the drive pulse voltage to the electrode of the optical sensor in a fifth state in which the second light source is turned off and a pulse width of the drive pulse voltage is the same as that of the third and fourth states;
- a nineteenth step of detecting a discharge current of the optical sensor in the fifth state;
- a twentieth step of detecting a discharge of the optical sensor based on the discharge current in the fifth state;
- a twenty-first step of calculating a discharge probability in the fifth state based on the number of times of application of the drive pulse voltage applied in the eighteenth step and the number of times of discharge detected in the twentieth step during the application of the drive pulse voltage; and
- a twenty-second step of referring to the storing portion that stores, in advance as known sensitivity parameters of the optical sensor, a difference in received light quantity received by the optical sensor between the third state and the fourth state in addition to the reference pulse width of the drive pulse voltage, and calculating received light quantities received by the optical sensor in the third, fourth, and fifth states, based on the sensitivity parameters stored in the storing portion, the discharge probabilities calculated in the thirteenth, seventeenth, and twenty-first steps, the pulse widths of the drive pulse voltage in the third, fourth, and fifth states, and the discharge probabilities calculated in the ninth step.

17. A received light quantity measuring method of a light detection system, the method comprising:
- a first step of periodically applying a drive pulse voltage to an electrode of an optical sensor that detects light emitted from a first light source in a first state in which the optical sensor is shielded from the light;
- a second step of detecting a discharge current of the optical sensor in the first state;
- a third step of detecting a discharge of the optical sensor based on the discharge current in the first state;
- a fourth step of calculating a discharge probability in the first state based on the number of times of application of the drive pulse voltage applied in the first step and the number of times of discharge detected in the third step during the application of the drive pulse voltage;
- a fifth step of periodically applying the drive pulse voltage to the electrode of the optical sensor in a second state in which the optical sensor is shielded from the light and a pulse width of the drive pulse voltage is different from that of the first state;
- a sixth step of detecting a discharge current of the optical sensor in the second state;

a seventh step of detecting a discharge of the optical sensor based on the discharge current in the second state;
an eighth step of calculating a discharge probability in the second state based on the number of times of application of the drive pulse voltage applied in the fifth step and the number of times of discharge detected in the seventh step during the application of the drive pulse voltage;
a ninth step of periodically applying the drive pulse voltage to the electrode of the optical sensor in a third state in which the optical sensor is shielded from the light and a pulse width of the drive pulse voltage is the same as that of either the first or second state or different from those of the first and second states;
a tenth step of detecting a discharge current of the optical sensor in the third state;
an eleventh step of detecting a discharge of the optical sensor based on the discharge current in the third state;
a twelfth step of calculating a discharge probability in the third state based on the number of times of application of the drive pulse voltage applied in the ninth step and the number of times of discharge detected in the eleventh step during the application of the drive pulse voltage;
a thirteenth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth, eighth, and twelfth steps, and the pulse widths of the drive pulse voltage in the first, second, and third states;
a fourteenth step of periodically applying the drive pulse voltage to the electrode of the optical sensor in a fourth state in which light from a second light source having a known light quantity is incident on the optical sensor or the second light source is turned off;
a fifteenth step of detecting a discharge current of the optical sensor in the fourth state;
a sixteenth step of detecting a discharge of the optical sensor based on the discharge current in the fourth state;
a seventeenth step of calculating a discharge probability in the fourth state based on the number of times of application of the drive pulse voltage applied in the fourteenth step and the number of times of discharge detected in the sixteenth step during the application of the drive pulse voltage;
an eighteenth step of periodically applying the drive pulse voltage to the electrode of the optical sensor in a fifth state in which a turning-on/turning-off state of the second light source is different from that of the fourth state and a pulse width of the drive pulse voltage is the same as that of the fourth state;

a nineteenth step of detecting a discharge current of the optical sensor in the fifth state;
a twentieth step of detecting a discharge of the optical sensor based on the discharge current in the fifth state;
a twenty-first step of calculating a discharge probability in the fifth state based on the number of times of application of the drive pulse voltage applied in the eighteenth step and the number of times of discharge detected in the twentieth step during the application of the drive pulse voltage; and
a twenty-second step of referring to the storing portion that stores, in advance as known sensitivity parameters of the optical sensor, a difference in received light quantity received by the optical sensor between the fourth state and the fifth state in addition to the reference pulse width of the drive pulse voltage, and calculating the received light quantities received by the optical sensor in the fourth and fifth states, based on the sensitivity parameters stored in the storing portion, the discharge probabilities calculated in the seventeenth and twenty-first steps, the pulse widths of the drive pulse voltage in the fourth and fifth states, and the discharge probabilities calculated in the thirteenth step.

18. A received light quantity measuring method of a light detection system, the method comprising:
a first step of periodically applying a drive pulse voltage to an electrode of an optical sensor that detects light emitted from a first light source in a first state in which the optical sensor is shielded from the light;
a second step of detecting a discharge current of the optical sensor in the first state;
a third step of detecting a discharge of the optical sensor based on the discharge current in the first state;
a fourth step of calculating a discharge probability in the first state based on the number of times of application of the drive pulse voltage applied in the first step and the number of times of discharge detected in the third step during the application of the drive pulse voltage;
a fifth step of periodically applying the drive pulse voltage to the electrode of the optical sensor in a second state in which the optical sensor is shielded from the light and a pulse width of the drive pulse voltage is different from that of the first state;
a sixth step of detecting a discharge current of the optical sensor in the second state;
a seventh step of detecting a discharge of the optical sensor based on the discharge current in the second state;
an eighth step of calculating a discharge probability in the second state based on the number of times of application of the drive pulse voltage applied in the fifth step and the number of times of discharge detected in the seventh step during the application of the drive pulse voltage;
a ninth step of periodically applying the drive pulse voltage to the electrode of the optical sensor in a third state in which the optical sensor is shielded from the light and a pulse width of the drive pulse voltage is the same as that of either the first or second state or different from those of the first and second states;
a tenth step of detecting a discharge current of the optical sensor in the third state;
an eleventh step of detecting a discharge of the optical sensor based on the discharge current in the third state;
a twelfth step of calculating a discharge probability in the third state based on the number of times of application of the drive pulse voltage applied in the ninth step and the number of times of discharge detected in the eleventh step during the application of the drive pulse voltage;

a thirteenth step of referring to a storing portion that stores, in advance as a known sensitivity parameter of the optical sensor, a reference pulse width of the drive pulse voltage, and calculating a discharge probability of a first type irregular discharge caused by a noise component other than a discharge occurring due to a photoelectric effect of the optical sensor, which occurs depending on the pulse width of the drive pulse voltage and which occurs without depending on a received light quantity received by the optical sensor, and a discharge probability of a second type irregular discharge caused by the noise component, which occurs without depending on the pulse width of the drive pulse voltage and the received light quantity received by the optical sensor, based on the sensitivity parameter stored in the storing portion, the discharge probabilities calculated in the fourth, eighth, and twelfth steps, and the pulse widths of the drive pulse voltage in the first, second, and third states;

a fourteenth step of periodically applying the drive pulse voltage to the electrode of the optical sensor in a fourth state in which light from a second light source having a known light quantity is incident on the optical sensor or the second light source is turned off;

a fifteenth step of detecting a discharge current of the optical sensor in the fourth state;

a sixteenth step of detecting a discharge of the optical sensor based on the discharge current in the fourth state;

a seventeenth step of calculating a discharge probability in the fourth state based on the number of times of application of the drive pulse voltage applied in the fourteenth step and the number of times of discharge detected in the sixteenth step during the application of the drive pulse voltage;

an eighteenth step of periodically applying the drive pulse voltage to the electrode of the optical sensor in a fifth state in which a turning-on/turning-off state of the second light source is different from that of the fourth state and a pulse width of the drive pulse voltage is the same as that of the fourth state;

a nineteenth step of detecting a discharge current of the optical sensor in the fifth state;

a twentieth step of detecting a discharge of the optical sensor based on the discharge current in the fifth state;

a twenty-first step of calculating a discharge probability in the fifth state based on the number of times of application of the drive pulse voltage applied in the eighteenth step and the number of times of discharge detected in the twentieth step during the application of the drive pulse voltage;

a twenty-second step of periodically applying the drive pulse voltage to the electrode of the optical sensor in a sixth state in which the second light source is turned off and a pulse width of the drive pulse voltage is the same as that of the fourth and fifth states;

a twenty-third step of detecting a discharge current of the optical sensor in the sixth state;

a twenty-fourth step of detecting a discharge of the optical sensor based on the discharge current in the sixth state;

a twenty-fifth step of calculating a discharge probability in the sixth state based on the number of times of application of the drive pulse voltage applied in the twenty-second step and the number of times of discharge detected in the twenty-fourth step during the application of the drive pulse voltage; and a twenty-sixth step of referring to the storing portion that stores, in advance as known sensitivity parameters of the optical sensor, a difference in received light quantity received by the optical sensor between the fourth state and the fifth state in addition to the reference pulse width of the drive pulse voltage, and calculating received light quantities received by the optical sensor in the fourth, fifth, and sixth states, based on the sensitivity parameters stored in the storing portion, the discharge probabilities calculated in the seventeenth, twenty-first, and twenty-fifth steps, the pulse widths of the drive pulse voltage in the fourth, fifth, and sixth states, and the discharge probabilities calculated in the thirteenth step.

* * * * *